United States Patent
Hoh

(10) Patent No.: US 9,940,546 B2
(45) Date of Patent: Apr. 10, 2018

(54) APPARATUS AND METHOD FOR SIGNAL EXTRACTION AND SEPARATION

(75) Inventor: Carl Kalon Hoh, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 739 days.

(21) Appl. No.: 13/440,634

(22) Filed: Apr. 5, 2012

(65) Prior Publication Data
US 2012/0259561 A1    Oct. 11, 2012

Related U.S. Application Data

(60) Provisional application No. 61/472,099, filed on Apr. 5, 2011.

(51) Int. Cl.
*G06K 9/62* (2006.01)
*G10L 21/0272* (2013.01)

(52) U.S. Cl.
CPC ........... *G06K 9/624* (2013.01); *G06K 9/6232* (2013.01); *G10L 21/0272* (2013.01)

(58) Field of Classification Search
CPC ... G06K 9/624; G06K 9/6232; G10L 21/0272
See application file for complete search history.

(56) References Cited

U.S. PATENT DOCUMENTS

| | | | |
|---|---|---|---|
| 6,691,073 B1* | 2/2004 | Erten et al. | 702/190 |
| 6,701,170 B2* | 3/2004 | Stetson | 600/323 |
| 6,983,264 B2* | 1/2006 | Shimizu | 706/22 |
| 7,917,196 B2* | 3/2011 | Zhang et al. | 600/512 |
| 7,942,818 B2* | 5/2011 | Euliano et al. | 600/304 |
| 2002/0136328 A1* | 9/2002 | Shimizu | 375/316 |
| 2006/0253044 A1* | 11/2006 | Zhang et al. | 600/512 |
| 2007/0233203 A1* | 10/2007 | Euliano et al. | 607/46 |
| 2009/0222262 A1* | 9/2009 | Kim et al. | 704/231 |
| 2011/0028827 A1* | 2/2011 | Sitaram et al. | 600/410 |

OTHER PUBLICATIONS

Marossero et al., "Independent Components Analysis for Fetal Electrocardiogram Extraction: A Case for the Data Efficient Mermaid Algorithm" 2003 IEEE XI11 Workshop on Neural Networks for Signal Processing.*
Hild et al., "Blind Source Separation Using Renyi's Mutual Information" IEEE Signal Processing Letters, vol. 8, No. 6, June 2001.*
Almeid, L. B., "MISEP—Linear and Nonlinear ICA Based on Mutual Informaton", Journal of Machine Learning Research, vol. 4, 2003, pp. 1297-1318.
Amari, S., "Natural Gradient Works Efficiently in Learning", Neural Computation, vol. 10, 1998, pp. 251-276.

(Continued)

*Primary Examiner* — John Kuan
(74) *Attorney, Agent, or Firm* — Greer, Burns & Crain, Ltd.; Steven P. Fallon

(57) ABSTRACT

Method and/or apparatus for independent component analysis of a mixed electronic signal. Candidate signal components are determined, and mutual information (MI) criteria between each candidate signal component is minimized. The candidate signal components are optimized using polar coordinates.

20 Claims, 22 Drawing Sheets

(56) References Cited

OTHER PUBLICATIONS

Bell, A. J., et al., "An Information-Maximization Approach to Blind Separation and Blind Deconvolution", Neural Computation, vol. 7, 1995, pp. 1129-1159.

Cardoso, J., "On the Stability of Source Separation Algorithms", Journal of VLSI Signal Processing Systems, 2000, pp. 7-14.

Cardoso, J.-F., "Infomax and Maximum Likelihood for Source Separation", IEEE Letters on Signal Processing, vol. 4, 1997, pp. 112-114.

Comon, P., "Independent Component Analysis—A New Concept?" Signal Processing, vol. 36, 1994, pp. 287-314.

Di Paola, R., et al., "Handling of Dynamic Sequences in Nuclear Medicine", IEEE Trans Nucl Sci., NS29, 1982, pp. 1310-1321.

Herault, J., et al., "Space or Time Adaptive Signal Processing by Neural Network Models", Neural Networks for Computing: AIP Conference Proceedings, 151, 1986, J. S. Denker, ed., American Institute for Physics, New York.

Hoh, C. K. et al., Poster Presentation "Extraction of Physiologic Signals with Independent Component Analysis", Annual Society of Nuclear Medicine Meeting, Jun. 2010.

Hoh, C. K., Presentation "Independent Component Analysis by Minimization of the Mutual Information Criteria in Polar Coordinates", proceedings of ICMIC on Apr. 7, 2010.

Maes, F., et al., "Multimodality Image Registration by Maximization of Mutual Information", IEEE Trans on Med-Imaging, vol. 16, No. 2, 1997, pp. 187-198.

Naganawa, M., et al., "Extraction of a Plasma Time-Activity Curve from Dynamic Brain PET Images Based on Independent Component Analysis", IEEE Trans on Biomed Engineering, vol. 52, No. 2, 2005, pp. 201-210.

Nelder, A., et al., "A Simplex Method for Function Minimization", Computer Journal, vol. 7, 1965, pp. 308-313.

Stögbauer, H., et al., "Least-Dependent-Component Analysis Based on Mutual Information", Physical Review E, vol. 70, 2004, 066123.

Viola et al., Intern J. Computer Vision, 1994, vol. 24, pp. 137-154.

\* cited by examiner $$W = \begin{bmatrix} \cos(\theta_1) & \sin(\theta_1) \\ -\sin(\theta_1) & \cos(\theta_1) \end{bmatrix} W_0$$

Counter clockwise rotation

FIG. 5

APPARATUS AND METHOD FOR SIGNAL EXTRACTION AND SEPARATION

PRIORITY CLAIM AND REFERENCE TO RELATED APPLICATION

This application claims the benefit of U.S. Provisional Application Ser. No. 61/472,099, filed Apr. 5, 2011, under 35 U.S.C. § 119. U.S. Provisional Application Ser. No. 61/472,099 is incorporated in its entirety by reference herein.

FIELD OF THE INVENTION

A field of the invention is electronic signal processing.

BACKGROUND OF THE INVENTION

It is desirable in many applications to extract or separate independent signal components from a signal mixture, such as a electronic (e.g., digital) signal mixture. For example, in imaging, it is highly useful to separate physiologic signal on dynamic medical image data to obtain images with improved demarcations. Other nonlimiting example applications include extraction of a source signal from a multi-spectral image, extracting signal data from sensor array signal data, separation of mixed digitized audio signals, etc.

It may be desirable to separate signals on either a spatial or a temporal basis. Independent Component Analysis (ICA) is a method for such temporal and spatial signal extractions. The general form of the ICA method is described in Eq. (1) below, where X is the signal mixture array (matrix), W is the unmixing (weight) matrix, and S is the estimated source signal array (matrix).

$$S = WX \qquad (1)$$

The transformation of X by W is a matrix multiplication, which is the inner product of row vectors in W with column vectors in X. Graphically, this is the projection of X onto W. Example ICA methods in the art include AMUSE, JADE, SOBI, and FastICA.

To estimate an optimal unmixing matrix for ICA, many prior methods for ICA involve a further transformation of S by g(S) based on a model probability density function (pdf) or a model cumulative density function (cdf) of the source signal. In such methods, there is a search for an unmixing matrix W that maximizes the entropy of the system (e.g., Infomax method) or maximizes the likelihood estimate to a given model (e.g., Maximum Likelihood method). The actual probability density function of the source signal is not known. However, these techniques work if the model probability density functions are an approximation to the source signal probability density functions.

SUMMARY OF THE INVENTION

Embodiments of the invention provide, among other things, a method and/or apparatus for independent component analysis of a mixed electronic signal. Candidate signal components are determined, and mutual information (MI) criteria between each candidate signal component is minimized. The candidate signal components are optimized using polar coordinates.

BRIEF DESCRIPTION OF THE DRAWINGS

FIG. 5 shows an example Givens rotation in two dimensions using polar coordinates;

DETAILED DESCRIPTION

Figure 1:
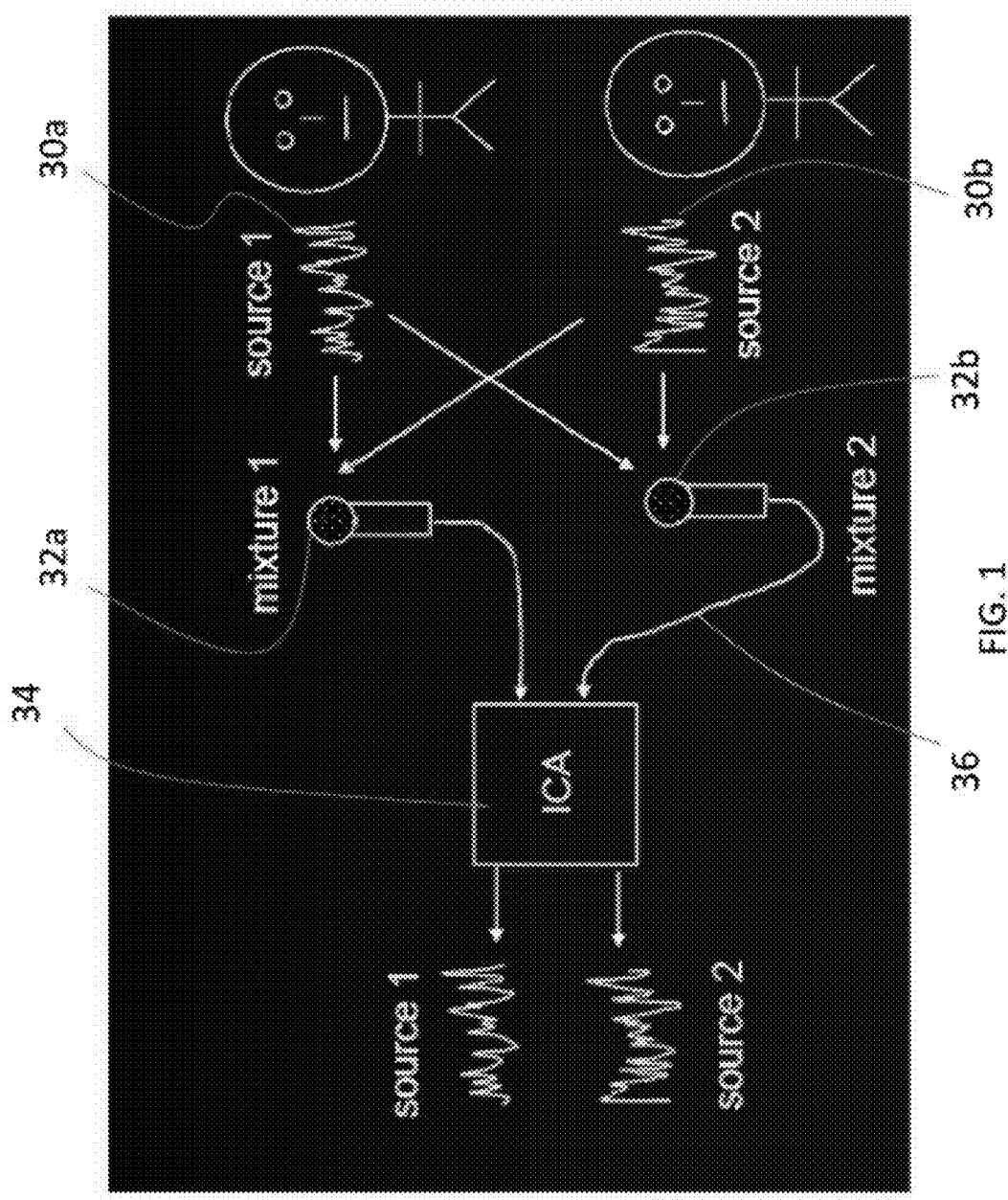
FIG. 1 shows an example application of Independent Component Analysis (ICA) for two sources and two transducers.

It is useful to provide a signal extraction method that does not rely on model probability density functions. Example methods involve the direct minimization of the mutual information or other cost function between the estimated source signals in S. In such techniques, the requirement of true "independence" between the signals is replaced with the goal of separating mutually correlated signals; i.e., separating statistically "dependent" signals. The mutual information (MI) criteria (e.g., criteria which measures the similarity of two data sets or distributions) can be defined for two discrete signals A and B in Equation (2) below, wherein $p_{AB}$ represents the joint histogram distribution, and $p_A$ and $p_B$ are the marginal distributions. In Eq. (2), A and B would represent two different rows within matrix S. The total MI would then be the sum of MIs for all possible combinations of rows in S.

$$MI(A, B) = \sum_{a_i \in \Omega_A} \sum_{b_i \in \Omega_B} p_{AB}(a_i, b_i) \log\left(\frac{p_{AB}(a_i, b_i)}{p_A(a_i) p_B(b_i)}\right) \quad (2)$$

While minimizing mutual information for signal extraction has been considered as a general possibility, implementation has not been successful due to the irregular behavior of the mutual information cost function. Thus, prior methods maximize (not minimize) mutual information, between the candidate signals and known signals. Further, most existing methods of Blind Source Separation and Independent Component Analysis perform the transformation and optimization in Cartesian Coordinates. Those methods known to the inventors that illustrate the use of a polar (angular) algorithm are typically limited in the number of angles.

It is useful to provide a signal processing method for extraction of at least independent signal components without prior model information. Example methods of the invention direct minimization of mutual information (MI) criteria between each candidate signal component. The candidate signal components are optimized using polar coordinates. Further, example methods can visualize behavior of MI criteria with various parameters, such as histogram bin size, potential effects of data interpolation, and the number of data vectors analyzed. This addresses issues relating to local minima and artifacts in MI cost functions that may be caused by interpolation (e.g., when a signal is between pixels in image co-registration).

Embodiments of the invention provide, among other things, a method for independent component analysis of a mixed electronic signal that reduces or minimizes mutual information criteria in polar coordinates. A preferred method provides the mixed electronic signal by receiving the signal, and in some embodiments processing the signal. The signal can be, for example, an image signal generated from received light, gamma rays, energy, electrical, etc., input, and the method can be implemented in an image processing system such as but not limited to a positron emission tomography (PET) system. In other example embodiments, the signal can be received audio signals from a sound wave input. The electronic signals can be provided via any suitable signal transducer for the signals of interest, can be received wired or wirelessly, and the signals can be processed (e.g., digitized, filtered, smoothed, etc.) by suitable methods prior to the extraction. For PET, a nonlimiting example preprocessing includes reconstruction of an image based on signals from detectors in response to photon interaction, as will be appreciated by those of ordinary skill in the art. Multiple transducers can be provided, for example, by multiple time frames of sampling an area over time.

Methods of the invention can be implemented with code that is stored on a non-transitory medium. Configured processors (e.g., computers, configured hardware, integrated circuits (including but not limited to ASICs) having configured hardware or firmware, etc.), including processors coupled to signal transducers by suitable signal couplings (e.g., electrical or optical signal wire), and including suitable memory and storage, can provide embodiments of the present invention. Results of example methods can be displayed on a suitable display, stored in non-volatile memory and/or non-transient storage, printed, etc., and thus embodiments of the invention can further include displays, storage media, memory, a printer, etc. coupled to the processor. It will be understood that reference to and description of example methods of the invention herein will also be applicable to apparatus and systems of the invention.

Generally, embodiments of the invention are applicable to image, audio, or other electronic signal mixture separation, such as extraction of a target signal that is contaminated by other signals, a mixture of signals from a plurality of sources, etc. A particular example application of the invention provides a method to extract physiologic signals from image data, e.g., PET data, which are contaminated by adjacent tissue or organ structures. Artisans will appreciate, however, that the invention can be applied to extract/separate signal sources from a variety of signal mixtures (e.g., digital signal mixtures) found in typical applications of spatial or temporal independent component analysis (ICA). Nonlimiting example applications include extraction of source signals of multispectral images, sensor array signal/data, and digitized audio signals.

Preferred methods extract or separate underlying signals within a mixture using ICA without any a priori information of the underlying signals (which can be initially unknown). The underlying signals are extracted when the minimum mutual information (MI) between each pair of extracted signal components is determined. The minimization is preferably performed simultaneously in multiple angular parameters. While previous solutions in the art have used angular (polar) plots of various cost functions in independent component analysis, these solutions have been presented with a limited number of angular parameters.

Methods of the invention are not intended to be limited by the number of angular parameters. Instead, example methods of the invention can automatically determine and set up appropriately sized look-up tables and array indices tables based on the number of angular parameters of the optimization, and are preferably only limited by the computational hardware memory size. The capability of displaying the MI cost function as a function of each angular parameter (from 0°-180°), allows a final check on the convergence and final parameter estimates at the global minimum. The ability to plot the mutual information criteria over the range of angular parameter values allows a visual assessment of the behavior of the MI as a cost function; e.g., effects due to data size, MI histogram bin numbers, and other variables on the "smoothness" of the MI criteria. Additionally, a final plot of the MI cost function over the range of angular parameter values also allows a visual test for confirming the final solution as the true global minimum.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example application of Independent Component Analysis, in which electronic target signals (in this example, audio signals, but is equally applicable to image signals) from two sources 30a, 30b, source 1 and source 2, are mixed. Mixture 1 is received at a first transducer 32a, which in this example is a microphone, and mixture 2 is received at a second transducer (e.g., microphone) 32b. The Independent Component Analysis method, implemented by a processor 34 coupled to the microphones by signal couplings 36, is performed on the signal mixture to provide extracted signals for both source 1 and source 2.

Figure 2:
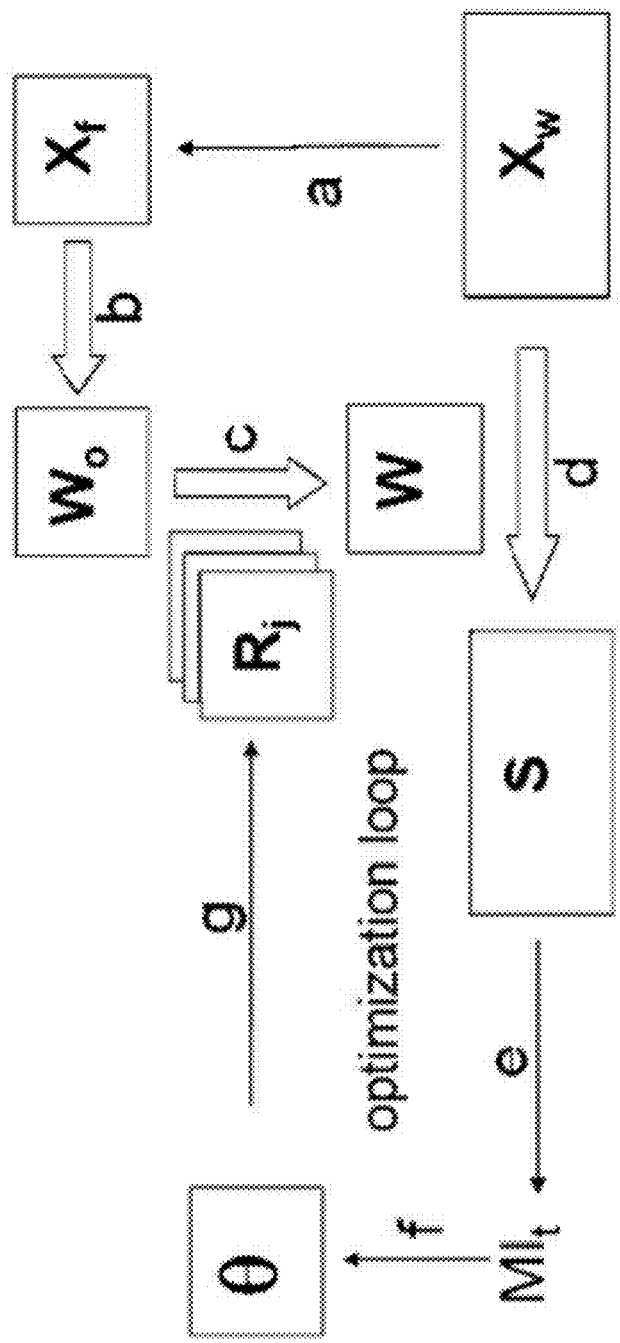
FIG. 2 shows an example processing algorithm for extracting signals from a signal mixture, according to an embodiment of the present invention.

A preferred method of the invention is a spatial or temporal signal processing method, for example, applied to an image processing method for extraction/separation of least independent signal components without prior model information. This preferred method directs minimization of mutual information (MI) criteria between each candidate signal component. Candidate signal components are optimized using polar coordinates. The behavior of mutual information can then be tested, in preferred embodiments, with histogram bin size, potential effect of data interpolation, and analysis of numbers of data vectors. An example method for independent component analysis using polar coordinates θ according to embodiments of the present invention is shown in FIG. 2. This example method, which can be implemented in a suitably configured processor, searches for k principal signal components in data embodied in a signal mixture matrix X.

The example method includes initial steps to set up initial starting parameters. Generally, the example steps are: a) determine k column vectors in a data array $X_w$ derived from the signal mixture matrix X, which k column vectors approximate the apices in factor analysis; b) perform matrix inversion to get initial weight vectors $w_o$ (rows in initial unmixing matrix $W_o$); and c) using a Givens rotation matrix R, orthogonally transform each $w_o$ separately to create an unmixing matrix W.

After the initial steps, an optimization process is performed to minimize mutual information (MI) between the signal components. These steps include: d) transform $X_w$ with the unmixing matrix W to obtain source matrix S; e) calculate total $MI_t$, sum of MI between each row in S; f) obtain new θ; and g) generate Givens rotations R to reapply to each $w_o$. Steps c)-g) are repeated in an optimization loop until convergence criteria are met.

The example method in FIG. 2 optionally starts with a dimensionally reduced and whitened form of the data, $X_w$, which is a k×n sized matrix, where k is the number of selected principal components, and n is the number of data vectors (Eq, (3)). For example, a data vector of length M could represent the intensity value of a pixel over M time sample points. For an audio or temporal signal, each data vector could represent the relative signal amplitude between the transducers at each time sample point M.

This example preprocessing employs principal component analysis (PCA) to obtain the k largest eigenvalues (π) and corresponding k eigenvectors (Φ) of $X^T$ (transpose of matrix X). ICA uses a zero mean vector, so preprocessing with PCA can also be performed assuming a zero mean as described, for example, by M. Naganawa et al., "Extraction of a Plasma Time-Activity Curve from Dynamic Brain PET Images Based on Independent Component Analysis," IEEE Trans. On Biomed Engineering, Vol., 52, No. 2, 2005, pp. 201-210. In Eq. (3) below, $\Lambda^{-1/2}$ is a k×k diagonal matrix containing the inverse square roots of the eigenvalues to whiten the data. The value of k (number of principal components selected) in an example embodiment is an operator determined value based on, for instance, a visual assessment of where the plot of the cumulative variance has the largest change.

$$X_w = \Lambda^{-1/2} \Phi X \quad (3)$$

Figure 3:
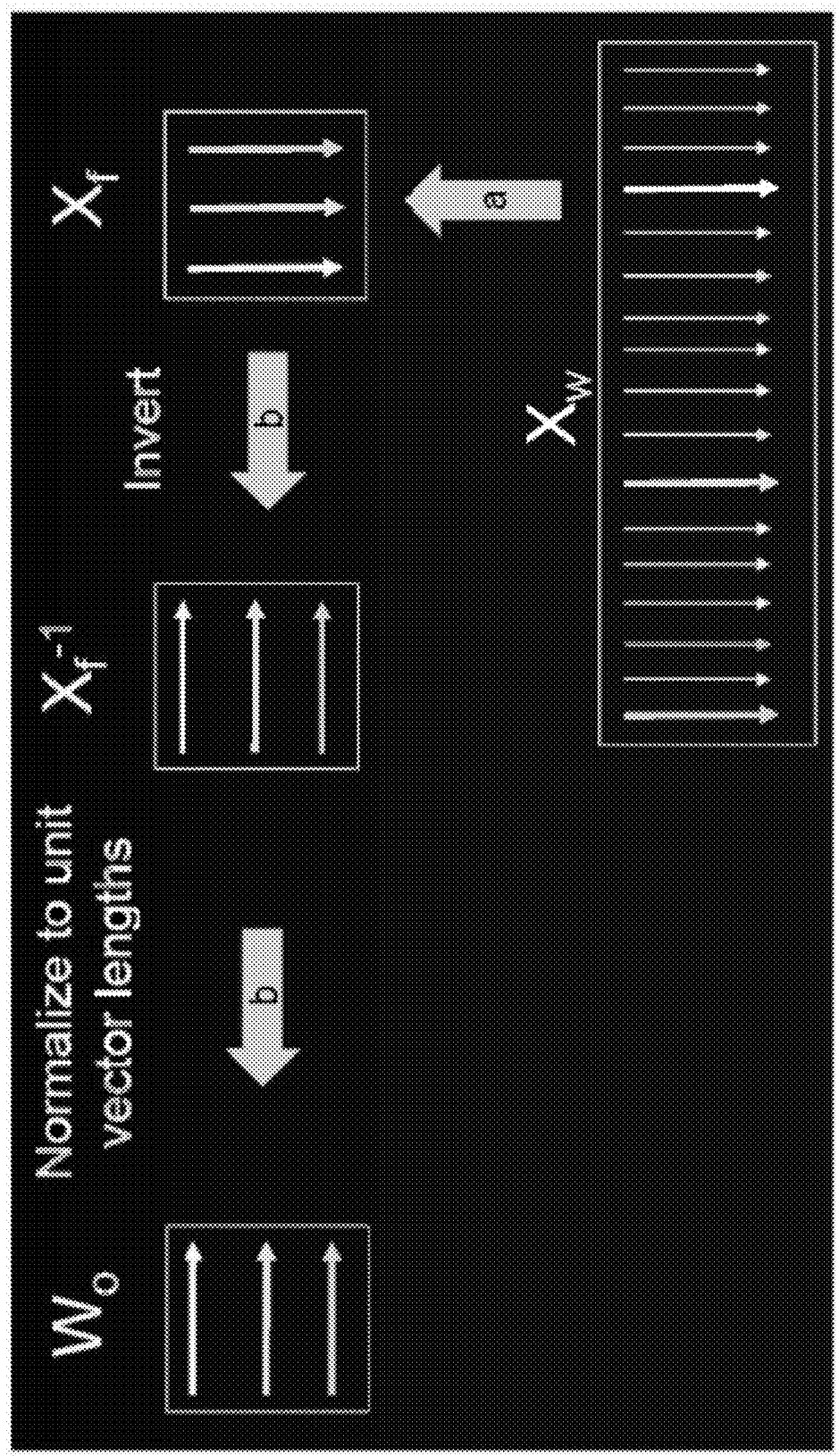
FIG. 3 shows an example matrix operation for generating initial weight vectors.

Signal mixture array $X_f$ contains k "uncorrelated" vectors from the original (dimensionally reduced and whitened) data array $X_w$ with the largest vector lengths. To generate $X_f$ (FIG. 2, step a) in an example embodiment, the initial conditions for the optimization are determined by searching for the k largest vectors (i.e., maximum vector length) that have unique directions (i.e., minimum correlation between them). This search can be rapidly accomplished in an example embodiment by first reverse sorting the column vector lengths in $X_w$ (i.e., from largest to smallest vector lengths), and then selecting the k vectors that show a significant change in vector direction from the prior sorted vector (such as, for instance, a correlation of less than 0.4). Selecting the k vectors can be performed in a particular example embodiment by selecting the largest vector as one of the k unique vectors, and while decrementing down the sort, selecting the next vector that has correlation of less than (for instance) 0.4 than any other prior selected vector. This subset of k selected column vectors is used as shown in FIG. 3 to create $X_f$, which is a signal mixture array that approximates the apex positions that are sought after in factor analysis.

Figure 4:
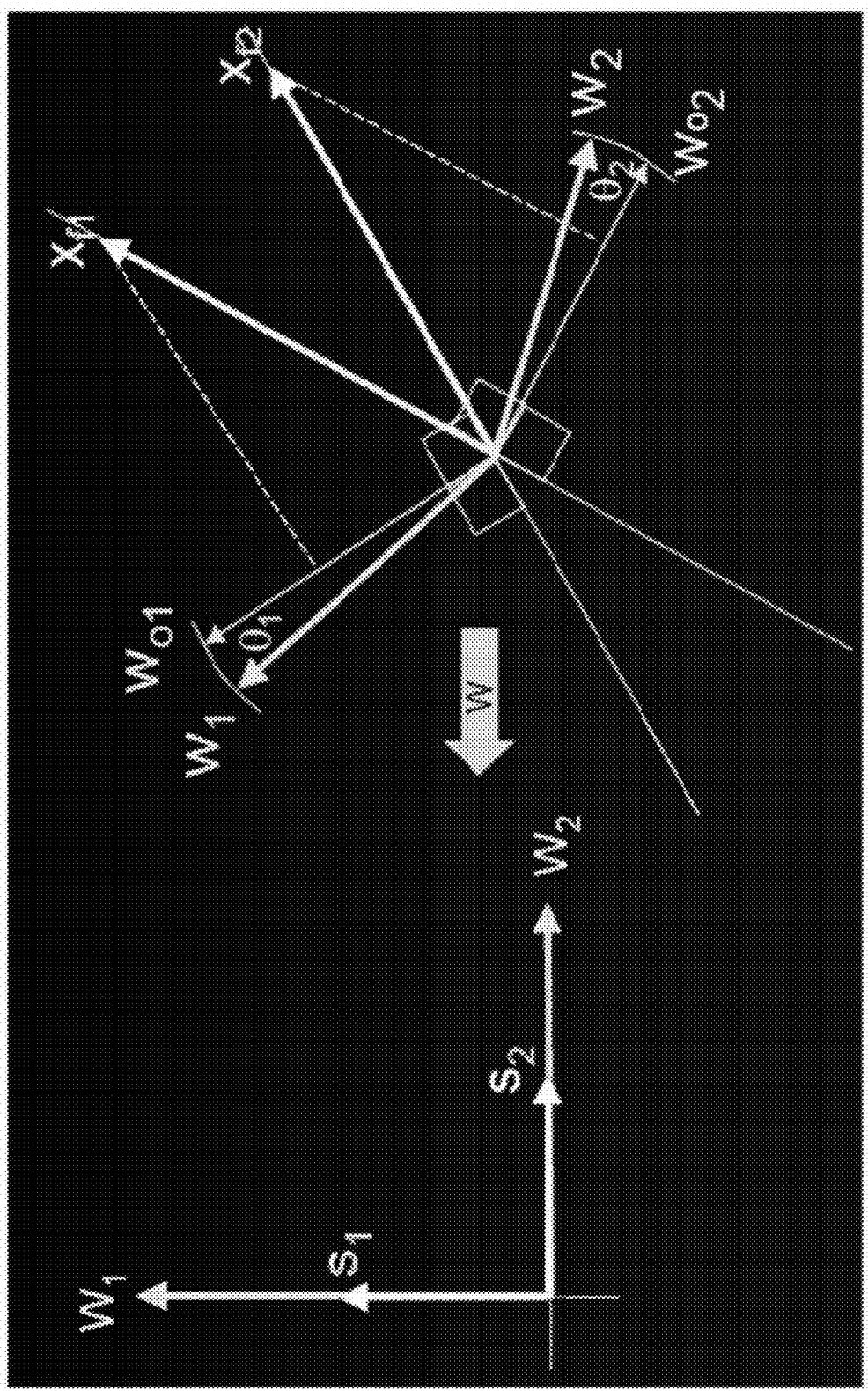
FIG. 4 shows an example inverse transformation to obtain initial weight vectors.

Next, a matrix inversion of $X_f$ is performed to provide initial weight vectors (FIG. 2 step b)). FIG. 3 shows an example process in which $X_f$ is inverted to obtain vectors $X_f^{-1}$ orthogonal to $X_f$, and normalizing $X_f^{-1}$ to provide the initial unmixing matrix (initial weight vector) $W_o$, which consists of k vector rows $w_o$ with unit length. Normalizing the row vectors in $X_f^{-1}$ does not change the row direction. FIG. 4 illustrates an inverse transformation obtaining initial weight vectors orthogonal to $X_f$.

Next, each $w_o$ weight vector row is taken out of $W_o$, individually rotated with k parameter angles within θ, and then placed back to create a new unmixing matrix W (FIG. 2 step c)). This allows independently rotating a weight vector without affecting the other weight vectors. The matrix θ represents a k×k sized matrix consisting of k parameter angles for the k weight vector rows in $W_o$. In an example embodiment the actual orthogonal rotation of each $w_o$ in k dimensional space can be accomplished by generating an orthogonal rotation matrix $R_j$ for each $w_{oj}$, where j indexes a row in $W_o$ (FIG. 2 step g)). The rotation matrix R is used to orthogonally transform each $w_o$ separately to create W. Each $R_j$ matrix itself is the product of D Givens rotations $G_j$, which are counter-clockwise rotations, where D is the number of rotational degrees of freedom (Eq. (4))

$$R_j = G_{ji} \quad (4)$$

where j=1 to k, i=1 to D, where D=k*(k−1)/2.

Figure 6:
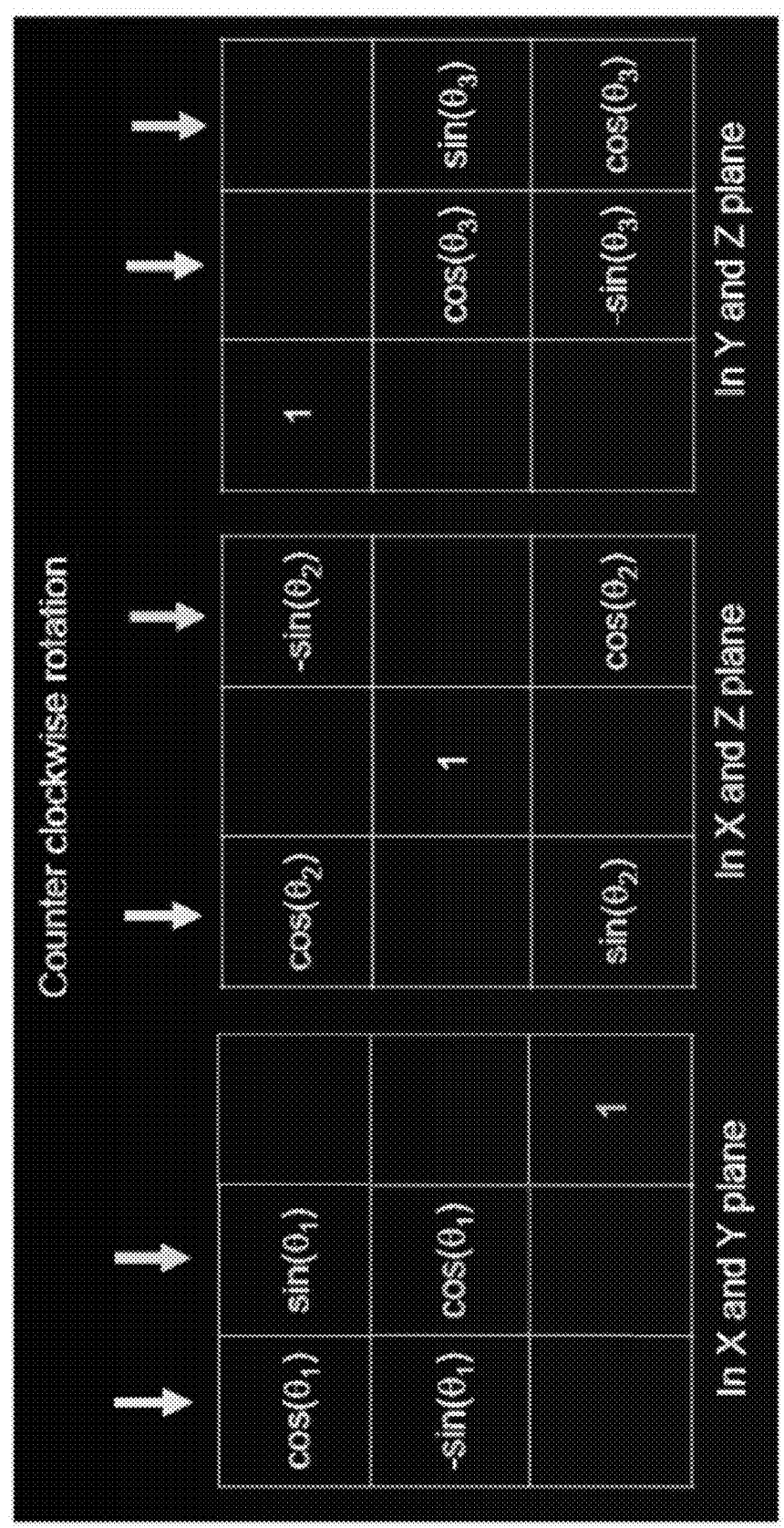
FIG. 6 shows an example Givens rotation in three dimensions using polar coordinates.

The elements in each $G_{ji}$ matrix preferably consist of only $\cos(\theta_i)$, $\sin(\theta_i)$, $-\sin(\theta_i)$, with the diagonal elements set to one, and the remaining elements set to zero. FIG. 5 shows an example Givens rotation in two dimensions (counter clockwise rotation), and FIG. 6 shows an example Givens rotation in three dimensions (counter clockwise rotation).

Figure 7:
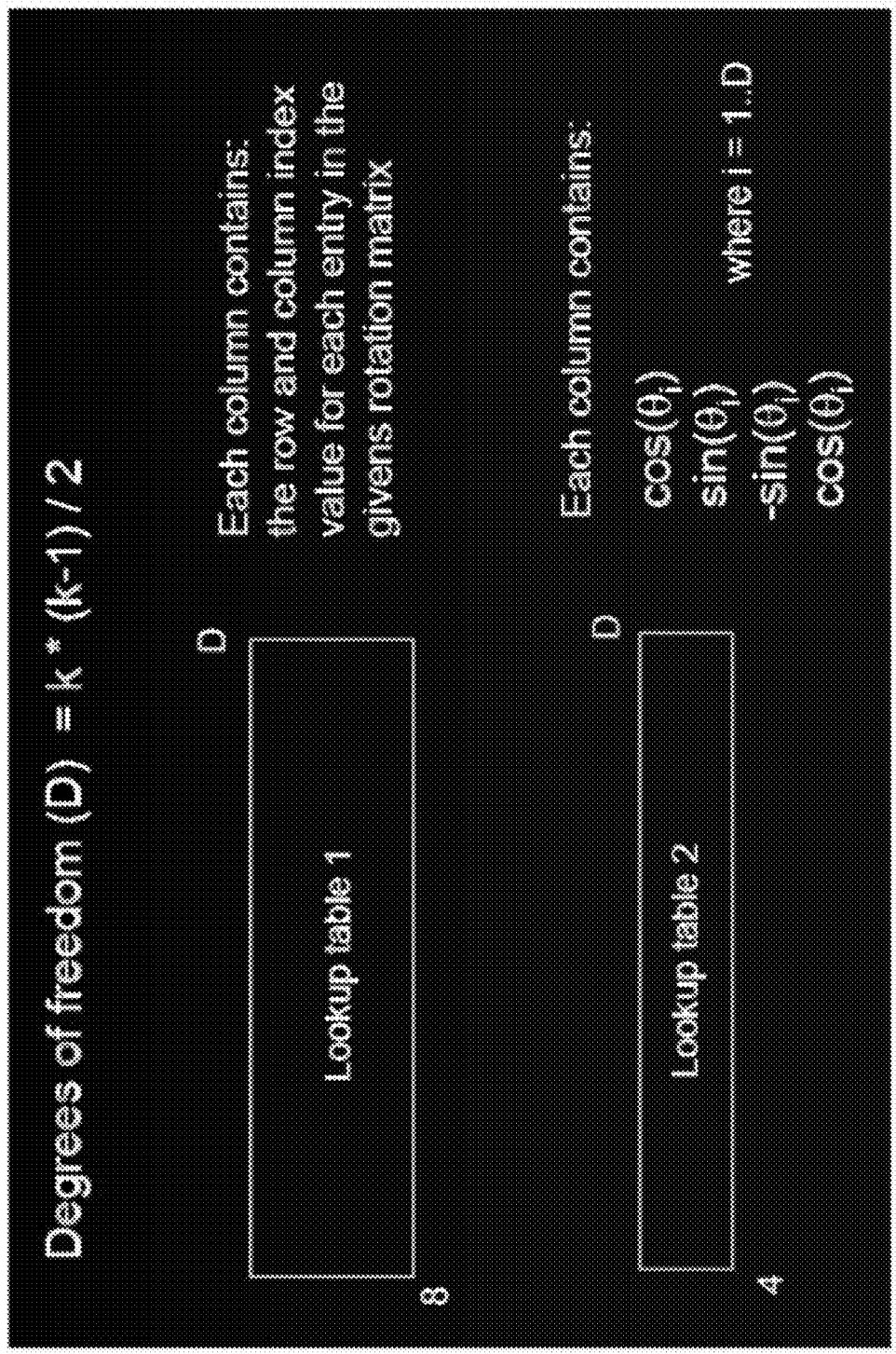
FIG. 7 shows example lookup tables for implementing Givens rotation in k dimensions.

In an example method for implementing Givens rotation in k dimensions, once the number of principal components (k) is defined, the elements of the D Givens rotations can be set up as look-up tables of sine and cosine functions or constants (0 or 1) in computer memory to rapidly calculate the orthogonal rotation of $w_o$. For example, as shown in FIG. 7, lookup table 1 is an 8×D table, in which each column contains the row and column index value for each entry in the Givens rotation matrix. Lookup table 2 is a 4×D table, in which each column contains $\cos(\theta_i)$, $\sin(\theta_i)$, $-\sin(\theta_i)$, $\cos(\theta_i)$, where i=1 . . . D. For a parameter angle estimate, the cosine and sine functions are called once and then entered into the multiple locations of the Givens rotation matrix (lookup table 1) minimizing the number of software calls to the cosine and sine functions.

Figure 8:
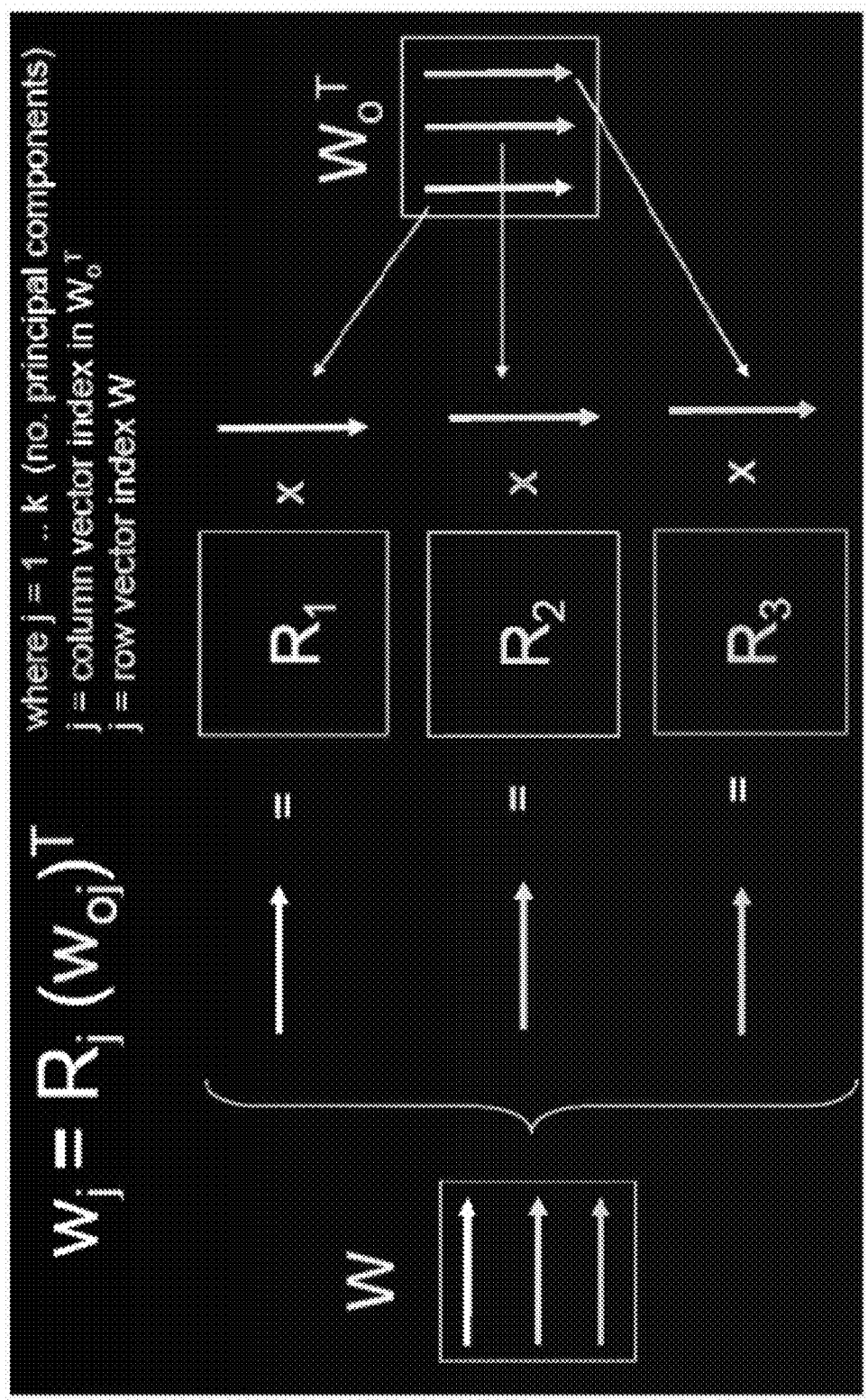
FIG. 8 shows an example matrix transformation for generating non-orthogonal rotation by orthogonal rotation of each row $w_o$ of a weight matrix $W_o$.

FIG. 8 shows an example generation of non-orthogonal rotation W by orthogonal rotation of each $w_o$. The formula $w_j = R_j(w_{oj})^T$ is applied, where j=1 . . . k (the number of principal components), j=column vector index in $W_o^T$ (T indicates a matrix transpose), and j=row vector index W.

Figure 9:
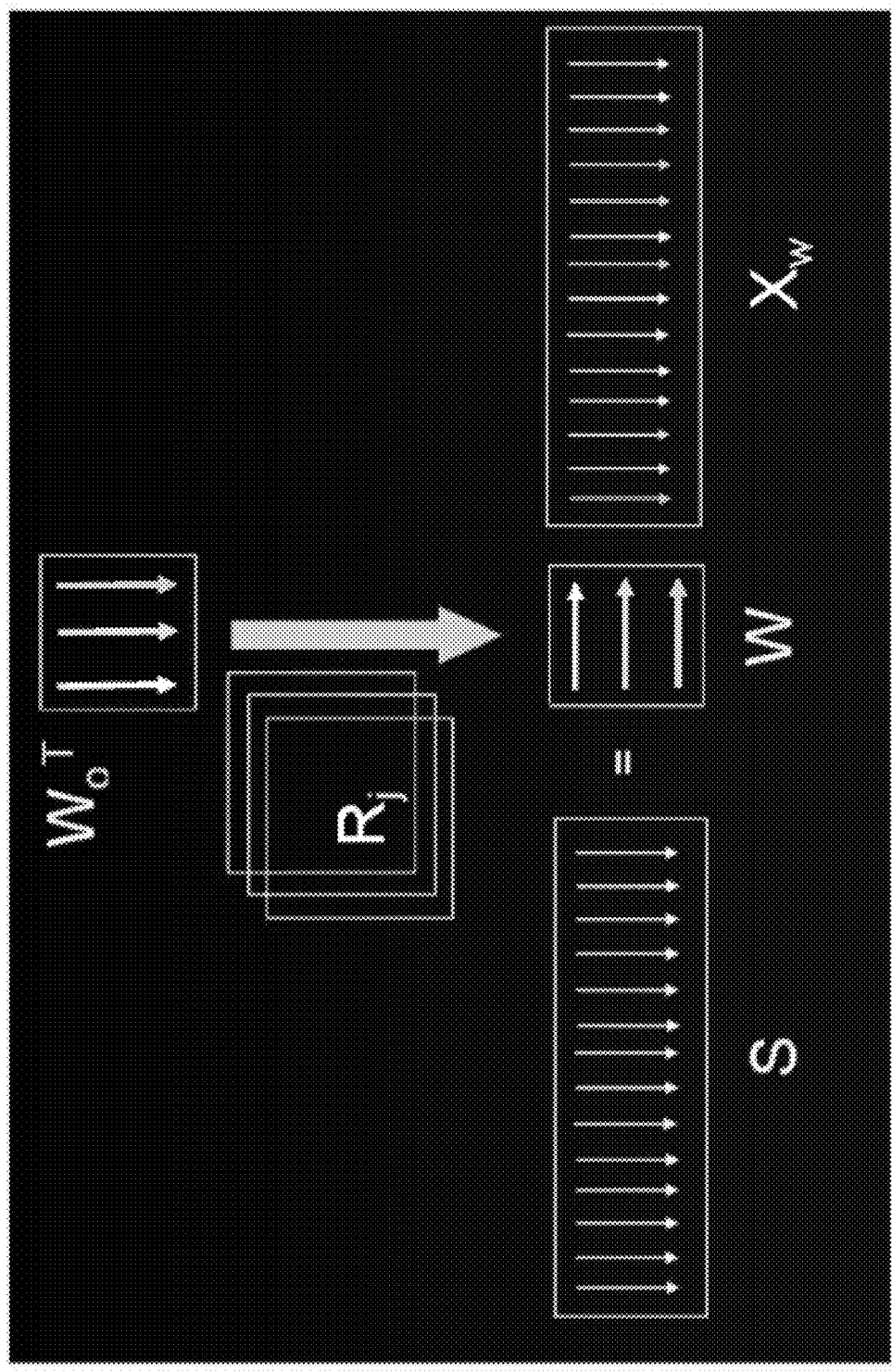
FIG. 9 shows an example matrix transformation for generating a source signal matrix S from a signal mixture matrix $X_w$.

After reloading each orthogonally rotated $w_o$ back into W, providing the new unmixing matrix, a non-orthogonal transformation is performed of the data $X_w$ to obtain S (FIG. 2 step d)). An example of this transformation is shown in FIG. 9.

The total mutual information (MI) between each row in the S matrix is then determined (FIG. 2 step e)). The above transformation allows the MI cost function to appear as a function of k×k angular parameters θ. The MI cost function can be calculated by Eq. (2), where the MI between all axes (i.e., rows) in S are totaled.

Iterations of steps c)-g) in FIG. 2 provide an optimization loop to minimize MI. The loop is performed in sequence. The search for the minimum MI can be performed, for instance, by the Nealder Mead downhill simplex method, as it is simple to implement and handles "ill-behaved" functions. In an example method for minimizing MI using the Nealder Mead downhill simplex method, the parameters of the optimization are the k×k angular rotations in θ (FIG. 1 step f)). Alternative, more efficient numerical optimizers, e.g., Marquette-Levenberg, can also be used.

An initial (nonlimiting) example set of parameters consists of random values ranging from −2 to +2 angular degrees from the initial directions of $w_o$. For each iteration, there is the generation of a new parameter matrix θ, which is applied to the rows on $W_o$ to generate a new W, which then transforms $X_w$ to a new S, which then provides a new MI value cost function (FIG. 1 step e)).

The example method iterates to a minimum MI. As the k parameter values in θ converge to the optimum solution (the minimum value of the MI cost function), they and the MI cost function will have minimal changes in their values. In a nonlimiting example, the stopping criteria can be where the MI values and each parameter value in θ changes by a small number, for instance, less than 0.01 percent. At convergence, a final parameter angle matrix $\theta_f$ and its corresponding final unmixing matrix $W_f$ are saved.

The final unmixing matrix $W_f$ allows the generation of properly scaled signals P and parametric independent component analysis (ICA) results (e.g., extracted signals) by performing the inverse of the transformation matrices in Eq. (5) below, where $S_m$ is a k×k sized diagonal matrix containing the maximum values of each row of S from $W_f × X_w$, Λ is a whitening matrix, and Φ are Eigen vectors, as explained above. Alternatively, if the values of each source signal (each row in S) are clustered around a mean, the mean value of each row of S may be used as $S_m$. The k rows in P are the independent or "pure" vectors in the units of the original data X.

$$P = (W_f^{-1} S_m)^T \Lambda^{1/2} \Phi \quad (5)$$

The independent vectors in the properly scaled signals P can be displayed time intensity curves of unmixed signals in a dynamic image or audio signal. For image processing, each column of matrix S, represents an image pixel and each row of S represent the relative contribution of the source signal within that pixel. The final S (image) and P (time intensity curves) can be, stored, printed, etc.

Preferred embodiment methods advantageously do not require a model or a priori information on the underlying source signal, which in many cases may be unknown, and they can perform minimization simultaneously in multiple angular parameters. Initialization steps (e.g., steps a)-c) in FIG. 2) in the example method automatically set up the appropriately sized look-up tables and array indices tables for the Givens rotations, based on the number of angular parameters of the optimization. Example methods are therefore only limited by the computational hardware memory size.

Example methods reveal regions of local minima, which need to be avoided in finding the optimum solution for signal separation, in polar plots of the mutual information. The example method preferably also allows a visual check for proper convergence on the global minimum (best solution) by displaying a plot of the cost function graphically over the full range of angular parameters (0-180°).

The example method of FIG. 2 has been demonstrated to separate signals, including separation of physiologic signals on dynamic medical image data to obtain images with improved demarcations. Furthermore, embodiments of the invention can be applied in general to extract/separate signal sources from a variety of digital signal mixtures found in typical applications of spatial and temporal independent component analysis (ICA). Potential applications include, but are not limited to, extraction of source signal of multispectral image, sensor array signal/data, and digitized audio signals.

Example results are provided herein for illustration. In an example algorithm, each pixel in the dynamic study was represented by a vector. Principal component analysis (PCA) and data whitening were first performed. The directions of the ICA weight vectors were then optimized by non-orthogonal rotations in multidimensional space, minimizing the total MI determined between each of the weight vectors. The effect of the joint histogram bin size (32×32, 64×64, 128×128, 256×256) in calculating the MI was plotted. Generation of the time activity curves (TAC) and ICA images were performed by inversion of the final transformation matrices (Eq. 5). Various types of dynamic data were tested: digital phantom, Rb-82 cardiac data, FDG brain data.

Figure 10:
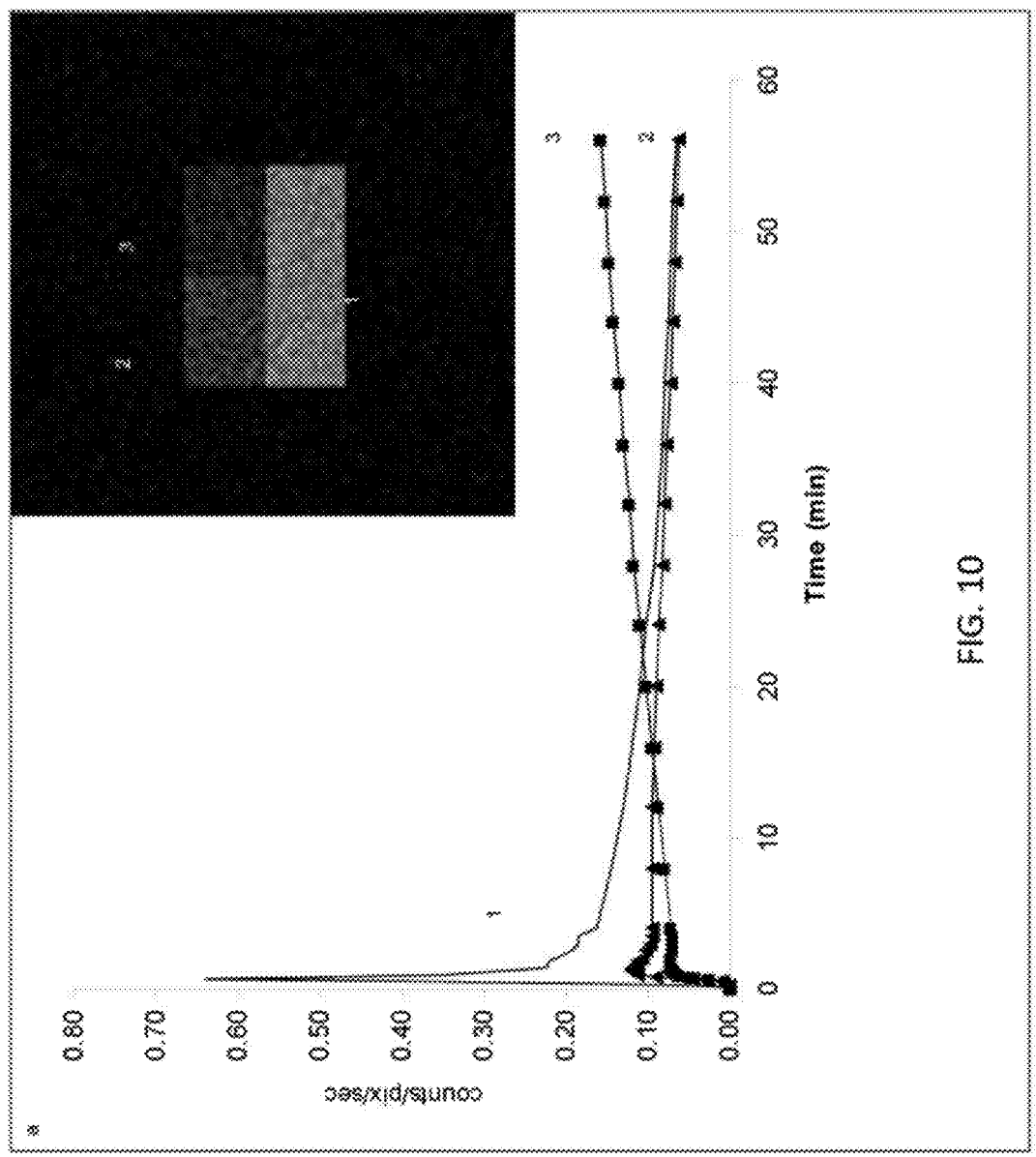
FIG. 10 shows simulated time activity curves (TCA) of plasma, normal liver, and tumor after bolus injection of FDG, and a dynamic test image with added noise composed of three regions where pixel intensity values vary as defined by the TCA.

Dynamic images (128×128×30 time frames) containing time varying signal and random noise were created to test the software. Dynamic test image #1 (FIG. 10) consists of three regions. In region 1, the image pixel intensity in of counts/pixel/see is proportional to the measured concentration of radioactivity in blood after intravenous bolus injection of the radiopharmaceutical 18F-fluorodeoxyglucose (FDG) in a human. In regions 2 and 3, the image pixel intensities are simulated to be proportional to the time varying tissue concentration of radioactivity in the normal human liver and malignant tumor, respectively, by tracer kinetic modeling. The vectors x(t) were generated by taking the time varying pixel intensities for each spatial location within a user drawn rectangular region of interest. The number of data vectors analyzed, x(t), could be increased by bilinear interpolation within the rectangular region of interest on the image in each time frame. Random Gaussian type noise was added to each element in x(t), where E is the output of the random Gaussian IDL function RANDOMN, $x_{max}$ is the maximum value in the X, and b is the user set percent noise level, as show in Eq. (6) below. The value b was set to 5% in both dynamic test images.

$$\text{Noise} = (EX_{max}b)/100 \qquad (6)$$

Figure 11:
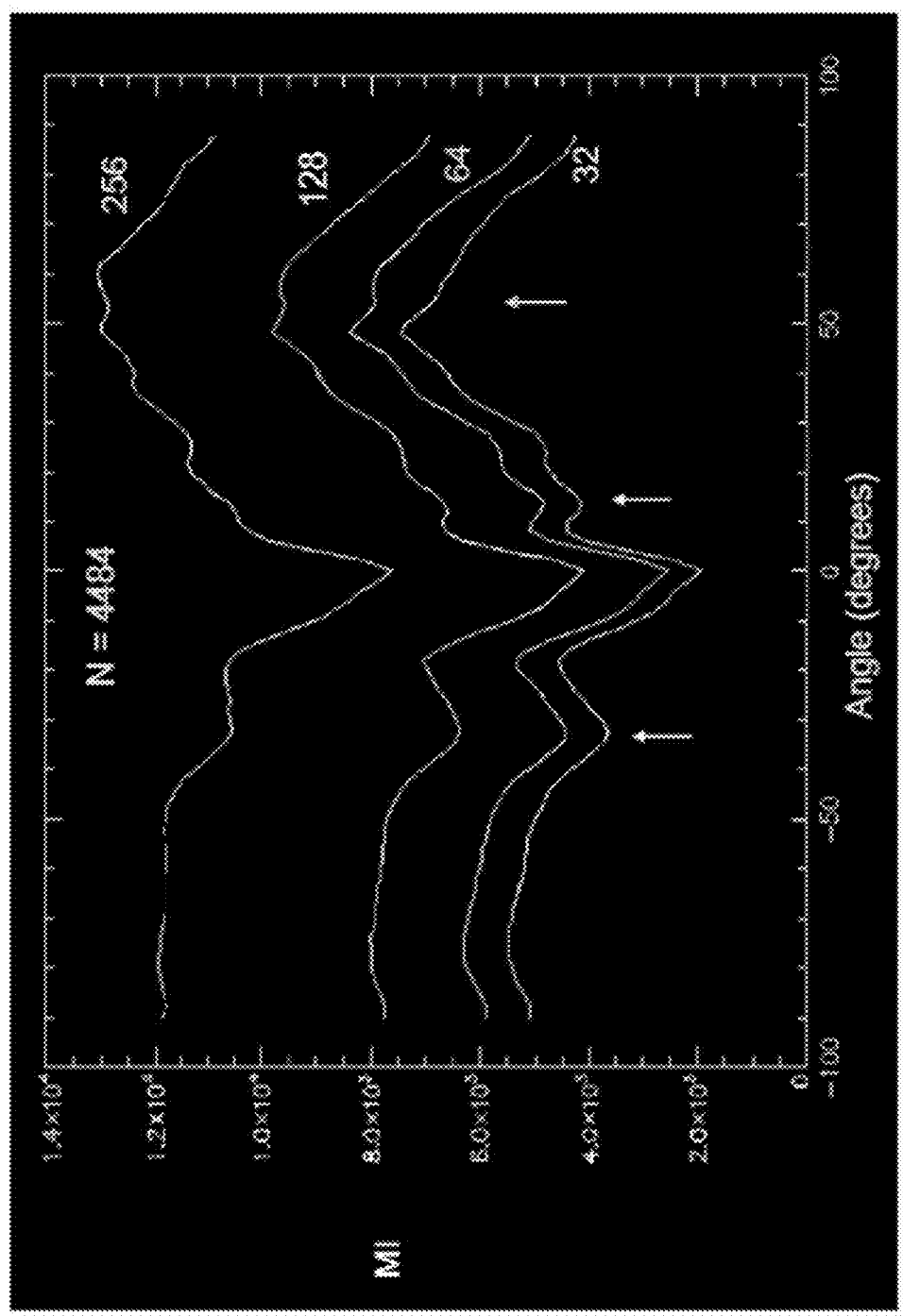
FIG. 11 shows effect of histogram bin sizes (32×32, 64×64, 128×128, 256×256) on total mutual information ($MI_t$), where all parameter angles are simultaneously rotated from −90° to +900.

The effect of the number of joint histogram bin sizes (32×32, 64×64, 128×128, 256×256) on the total mutual information ($MI_t$) from a data set consisting of 4484 data samples (i.e., 4484 x(t) vectors) is shown in FIG. 11. The $MI_t$ is plotted varying all parameter angles θ simultaneously from −90° to 90°. The plot shows that there are local minimum which are relatively close (±20°-30°) to the global minimum. These minimum appear to be less deep when the number of histogram bin sizes increases. Even with the 256×256 bin size there are still persistent local minima. Further, near the global minimum (±10°), the MI cost function "appears" relatively well behaved.

Figure 12A:
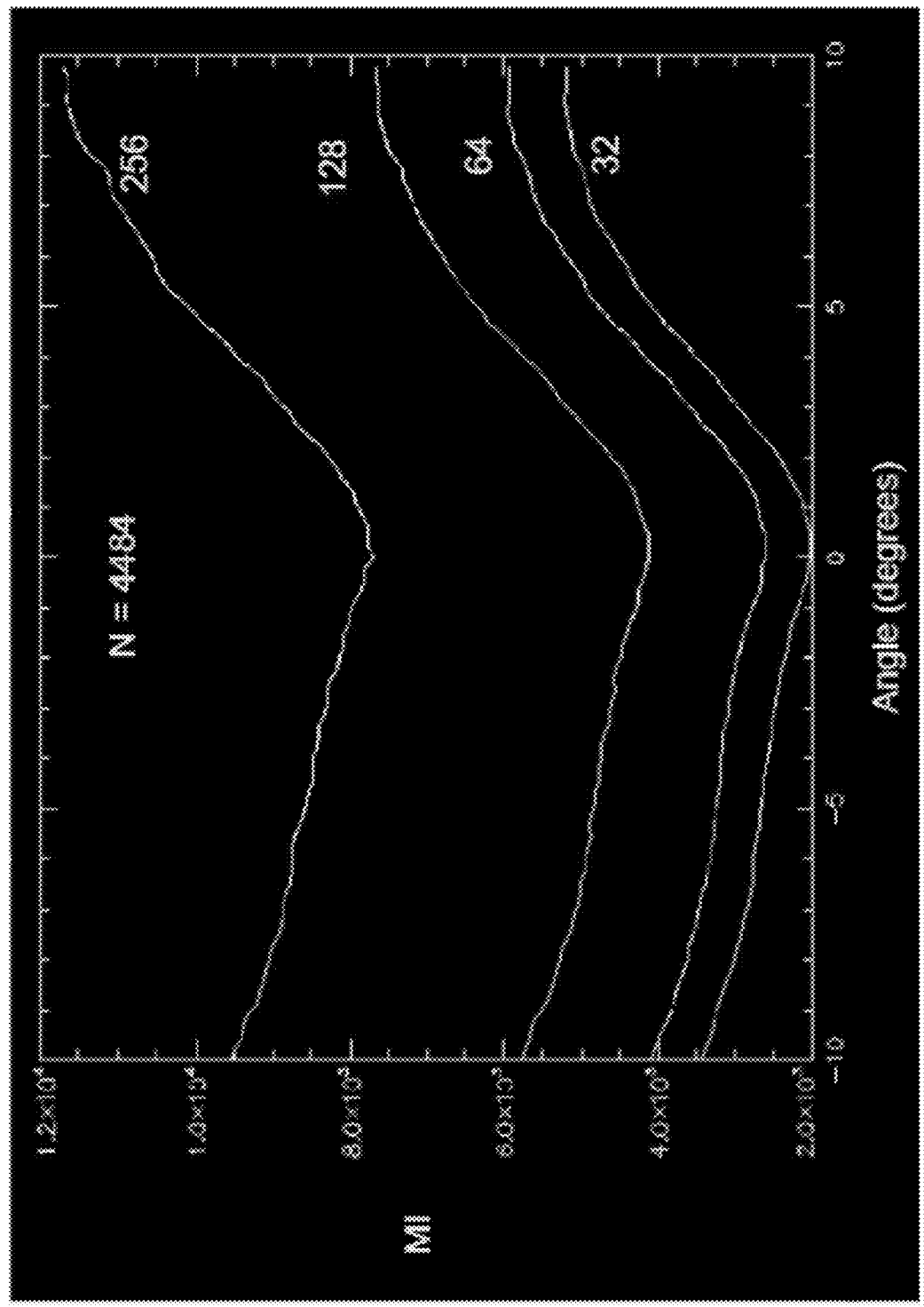
FIGS. 12A-12B show effects of histrogram bin sizes (32×32, 64×64, 128×128, 256×256) on total mutual information ($MI_t$), where all parameter angles are simultaneously rotated from −10° to +10°, without interpolation (FIG. 12A) and with distance weighted histogram interpolation (FIG. 12B)
Figure 12B:
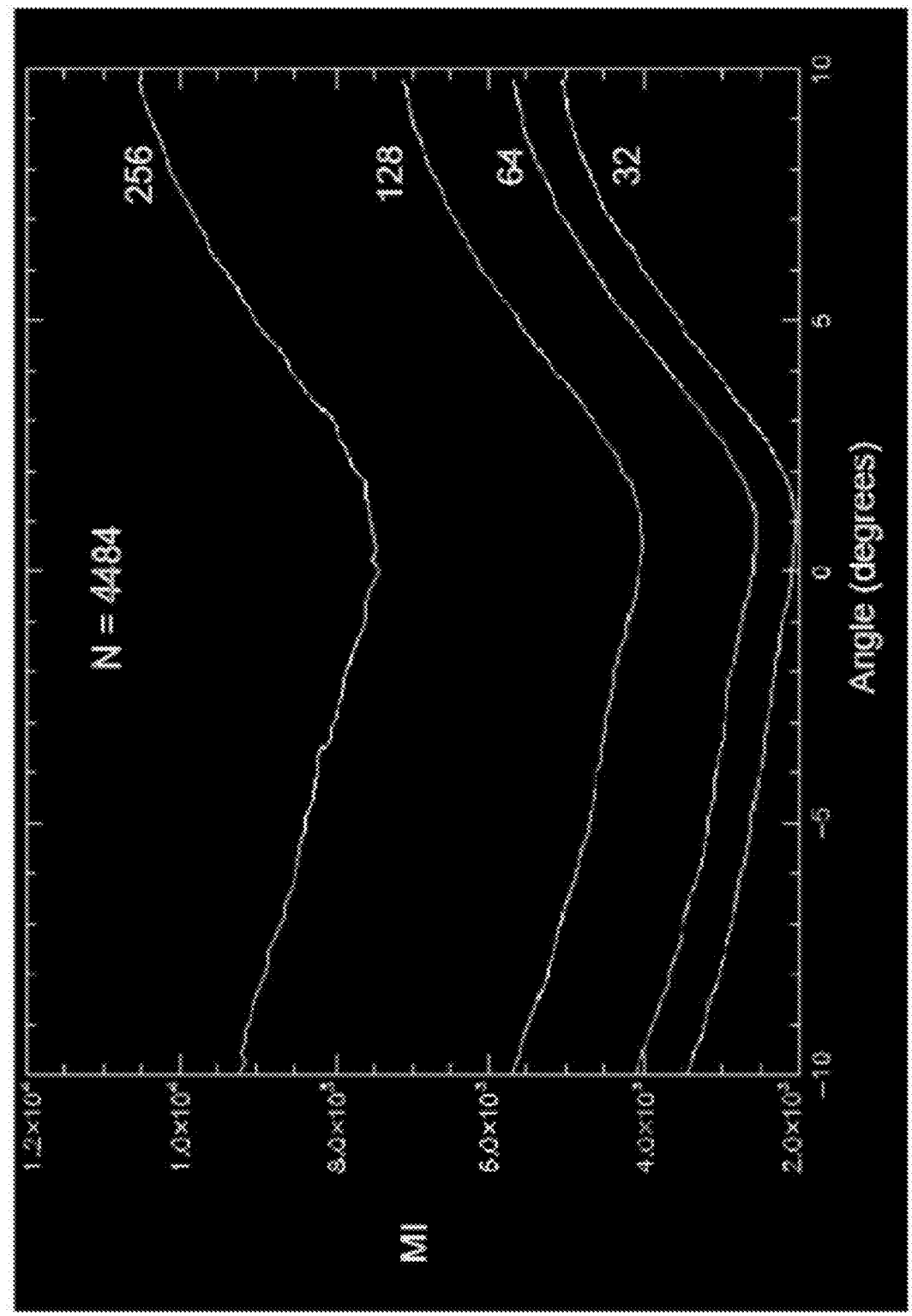

A recalculation and replot of the total MI with a finer resolution, from −10° to +100, shows that the higher bin size (256×256) reduces the "smoothness" of the MI function (FIG. 12A). The true global minimum can be in error and the lower bin sizes (128, 64, and 32) shows that it may be ½° off. Reanalysis with a distance weighted interpolation method to smooth out the MI function is plotted over the −10° to +100 and shows no visible improvement in the MI function (FIG. 12B).

Figure 13:
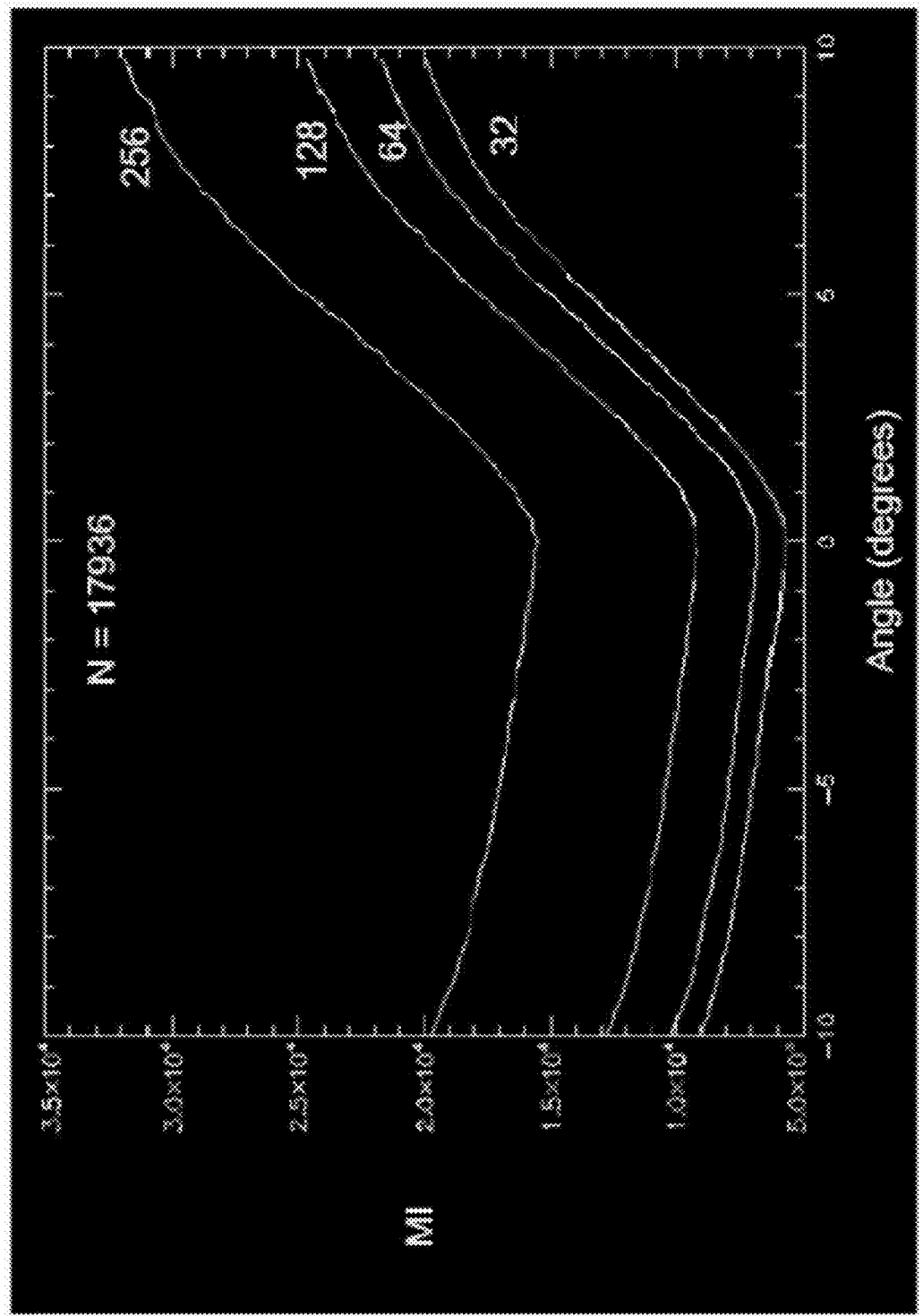
FIG. 13 shows effect of histogram bin size on total mutual information ($MI_t$) with a higher number of data samples (N=17936) as compared to 4484 samples in FIGS. 11 and 12A-12B.

Increasing the number of data samples analyzed by a factor of 4 (N=17936) by bilinear interpolation of the original image pixels provides a smoother MI function when calculated with the 256×256 histogram bins, as shown in FIG. 13. Also, all bin sizes appear to show the same global minimum at zero.

Figure 14:
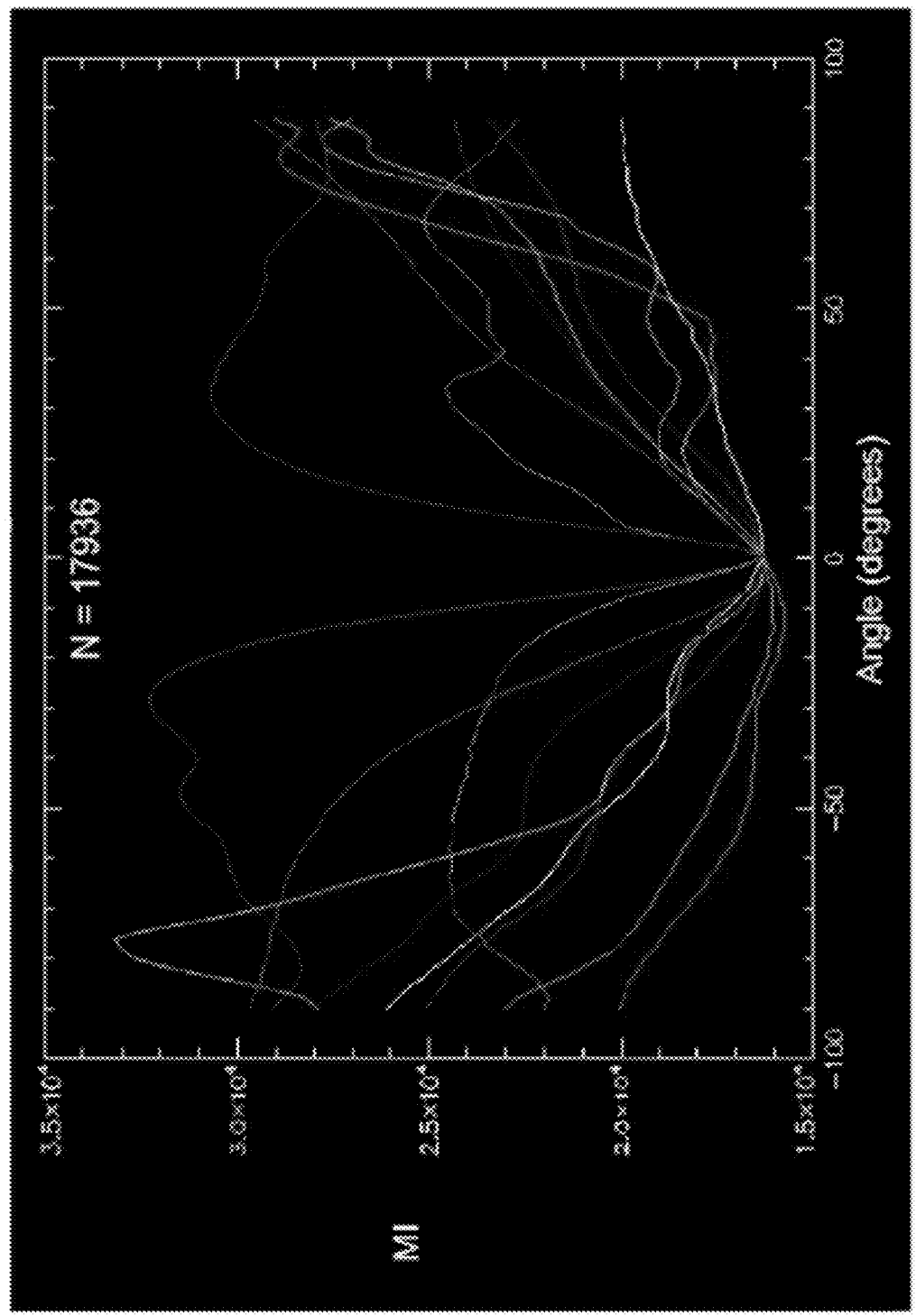
FIG. 14 shows total mutual information ($MI_t$) where each parameter angle is orthogonally rotated individually from −90° to +90°, and the histogram size is set to 256×256 bins.
Figure 15:
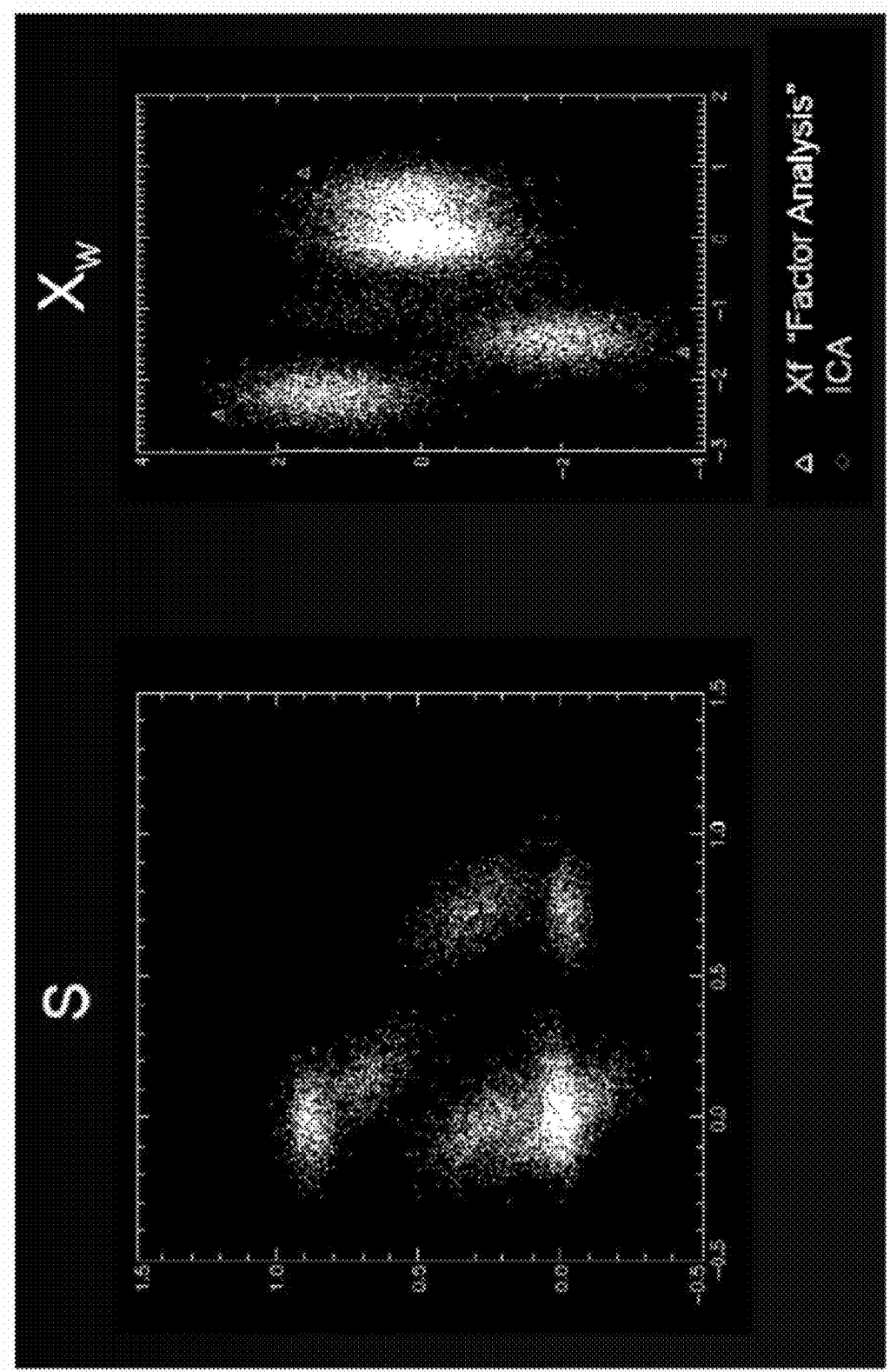
FIG. 15 shows a source signal (S) and a signal mixture Xw for the first dynamic image (dynamic image #1)

The complex behavior of the MI function is shown in FIG. 14. The total MI is plotted for each parameter angle as it is individually changed from −90° to +90° while the other parameter angles are held constant. FIG. 15 shows example S and $X_w$ for the dynamic test image.

Figure 16:
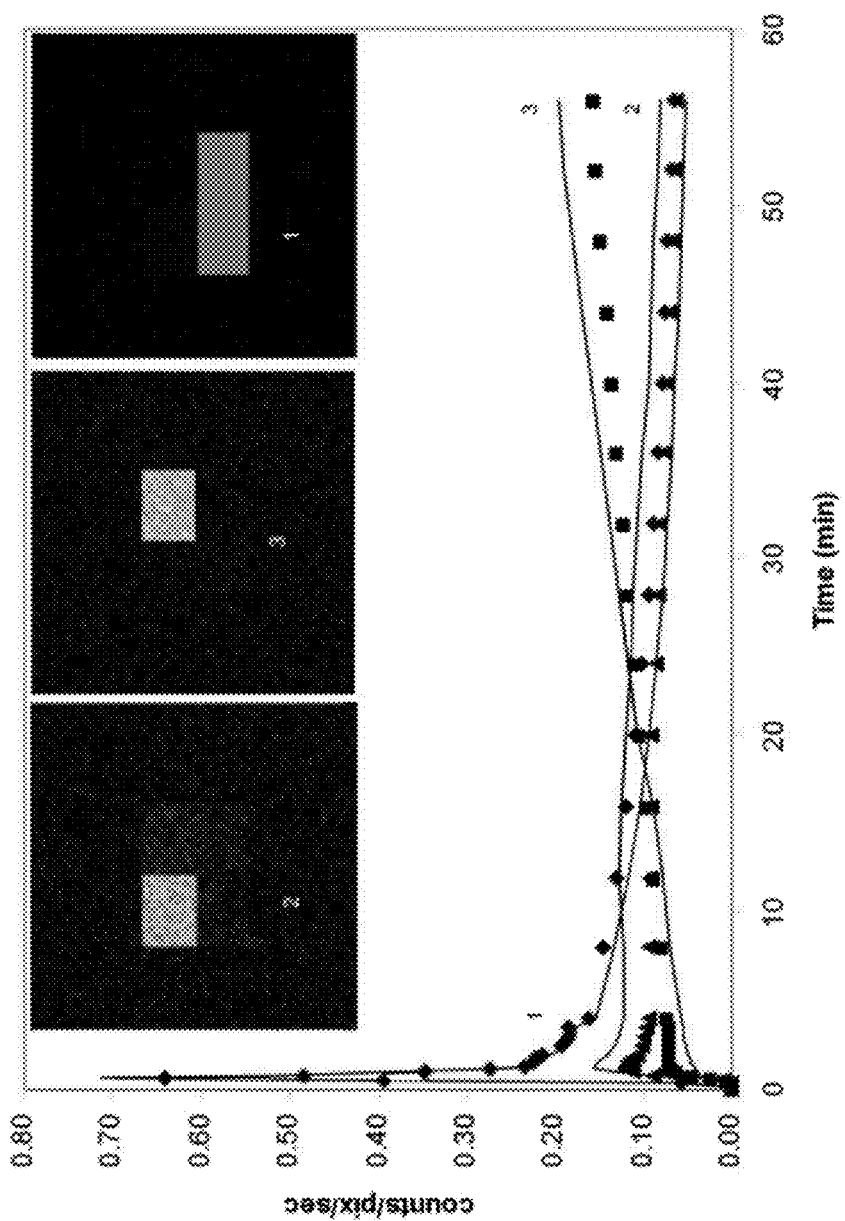
FIG. 16 shows a comparison of ICA extracted curves (solid lines) to original curves (data points) and their associated component images generated from dynamic test image #1.

The array of independent source vectors (that is, the least dependent source vectors) P, calculated in Eq. (5), is shown in FIG. 16.

Images of the "independent" components were generated by rescaling each value within a row of matrix S to a fraction of its row maximum value (FIG. 16, 1-3), and then assigning this value as the spatial intensity value. This value will change from 0 to 1 and is analogous to the method of creating factor images in factor analysis.

Figure 17:
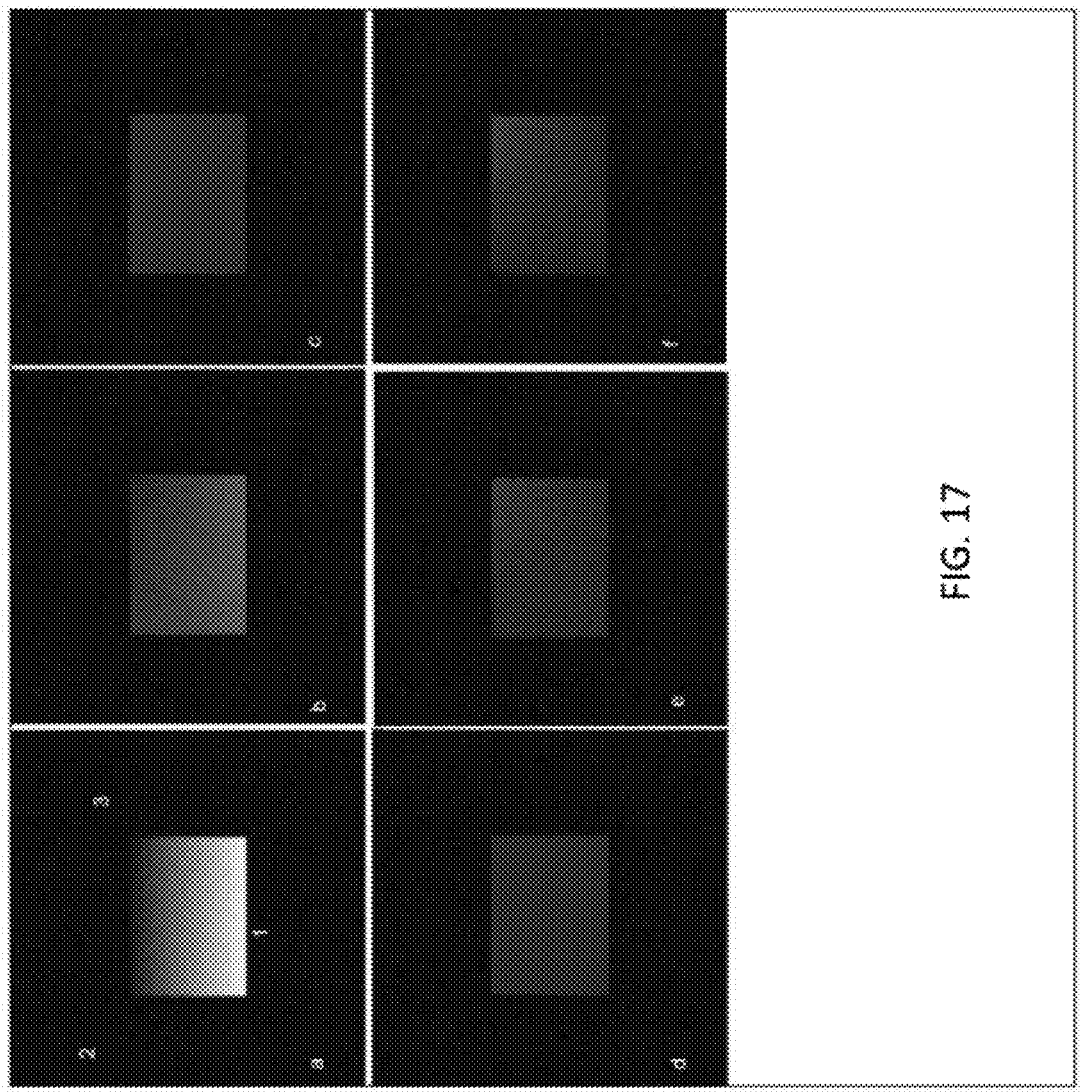
FIG. 17 shows a second dynamic image (dynamic test image #2), showing image frames at times 0.7, 1.5, 3.0, 16, 36, and 60 minutes (a-f, respectively), containing plasma curves along the bottom row of pixels (1), normal liver in top left corner pixel (2), and tumor in top right corner pixel (3), where pixels within the phantom are a summed combination of intensities based on their inverse linear distance from their bottom edge or corners.
Figure 18:
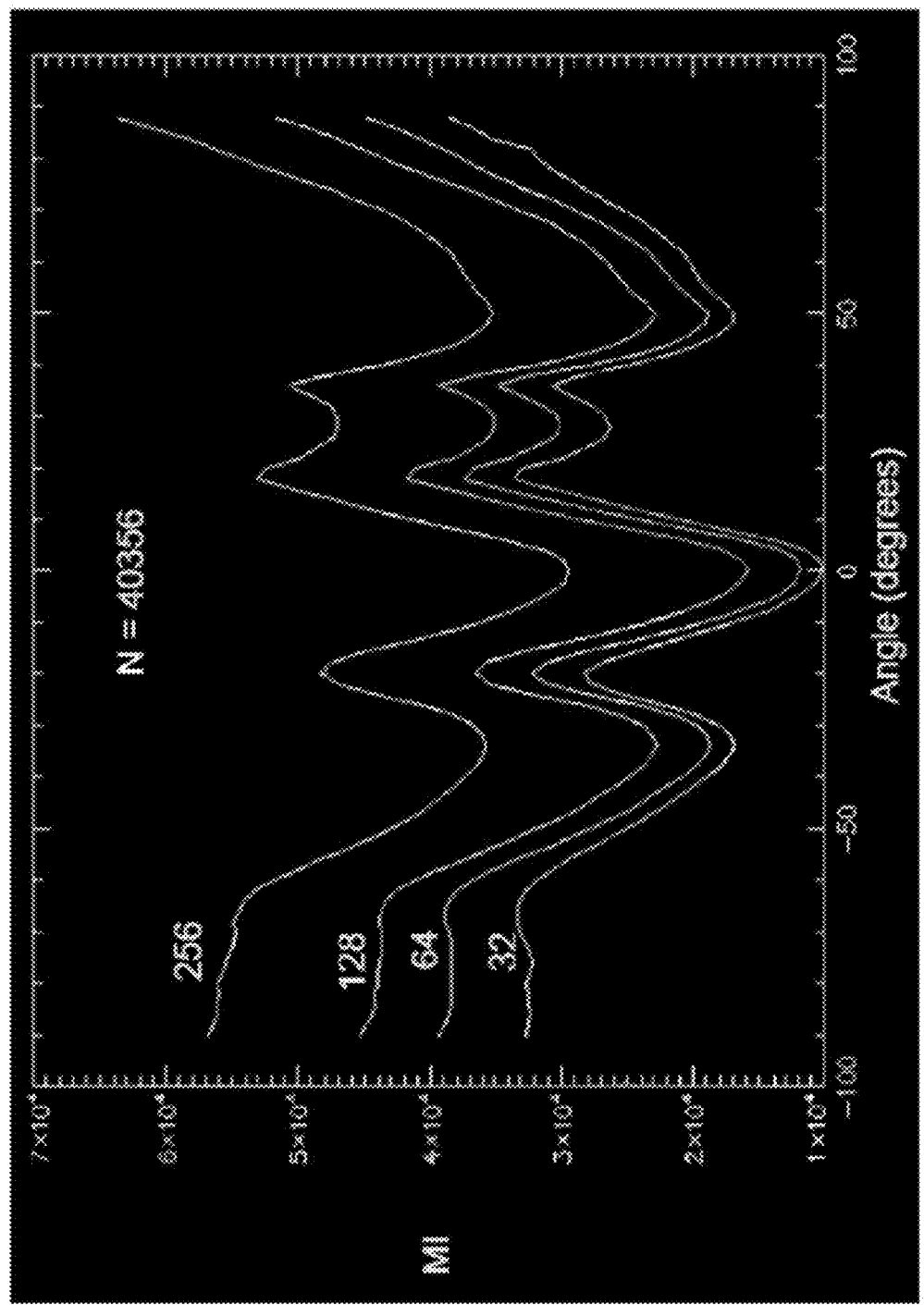
FIG. 18 shows an effect of histogram bin sizes on total mutual information ($MI_t$) where all parameter angles are simultaneously changed from −90° to +90° for dynamic test image #2.
Figure 19:
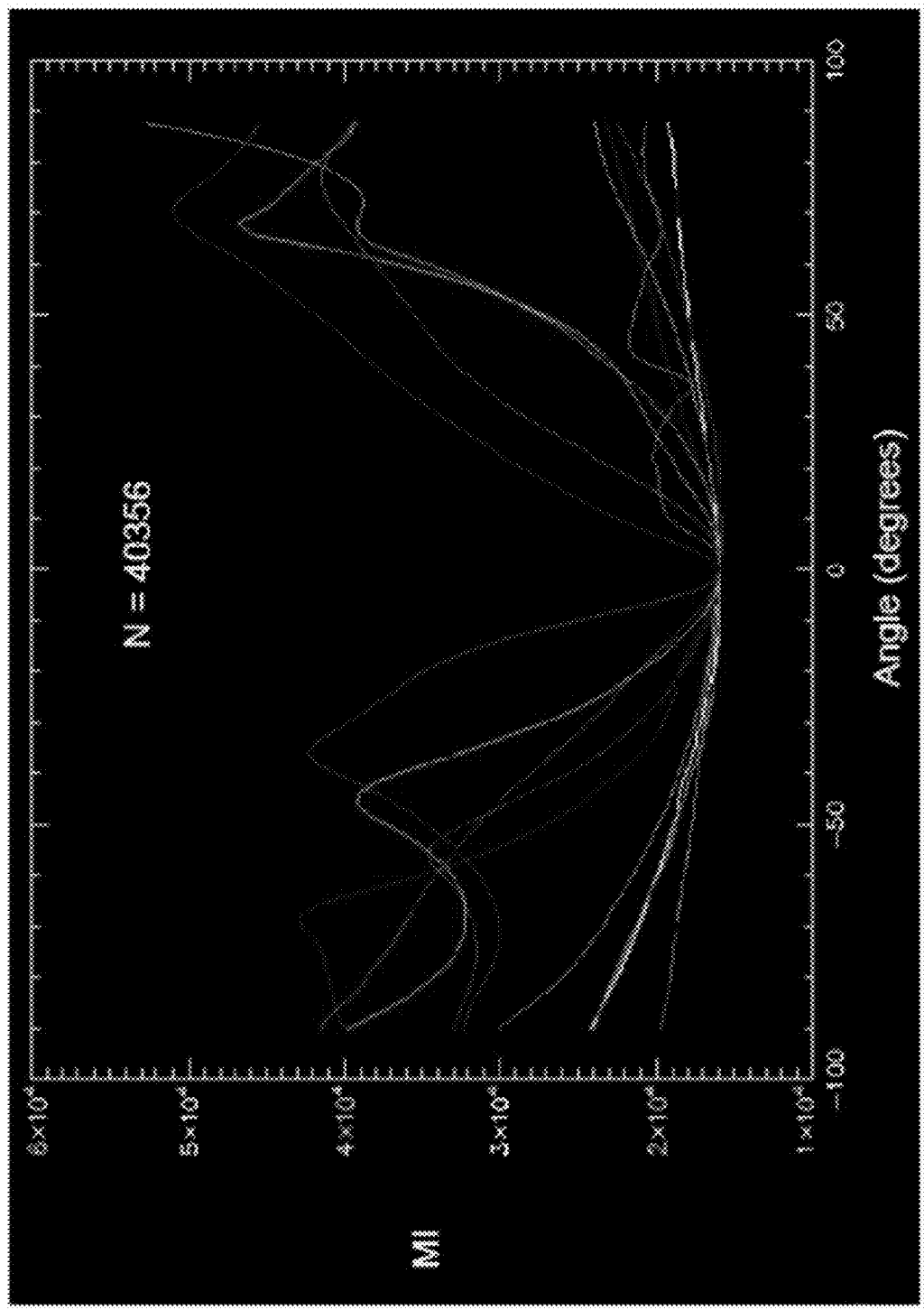
FIG. 19 shows total mutual information ($MI_t$), where each parameter angle is orthogonally rotated individually from −90° to +90° for dynamic test image #2, and where the histogram bin size was set to 128×128 bins.

Dynamic test image #2 contains a linear mixture of pixel time activity curves, and is shown in FIG. 17. Only the bottom edge, top left corner, and top right corners have pure source vectors of plasma, liver, and tumor, respectively. For the second dynamic test image, there are large and deep local minima in the $MI_t$ plot when the parameter angles are simultaneously changed from −90° to +90°(FIG. 18). The minima persist even with a high number of data samples (N=40356). The effect of rotating each parameter angle individually is shown in FIG. 19. Both plots show that the correct global minimum is achievable if the initial parameters are within 10° of the global minimum.

Figure 20:
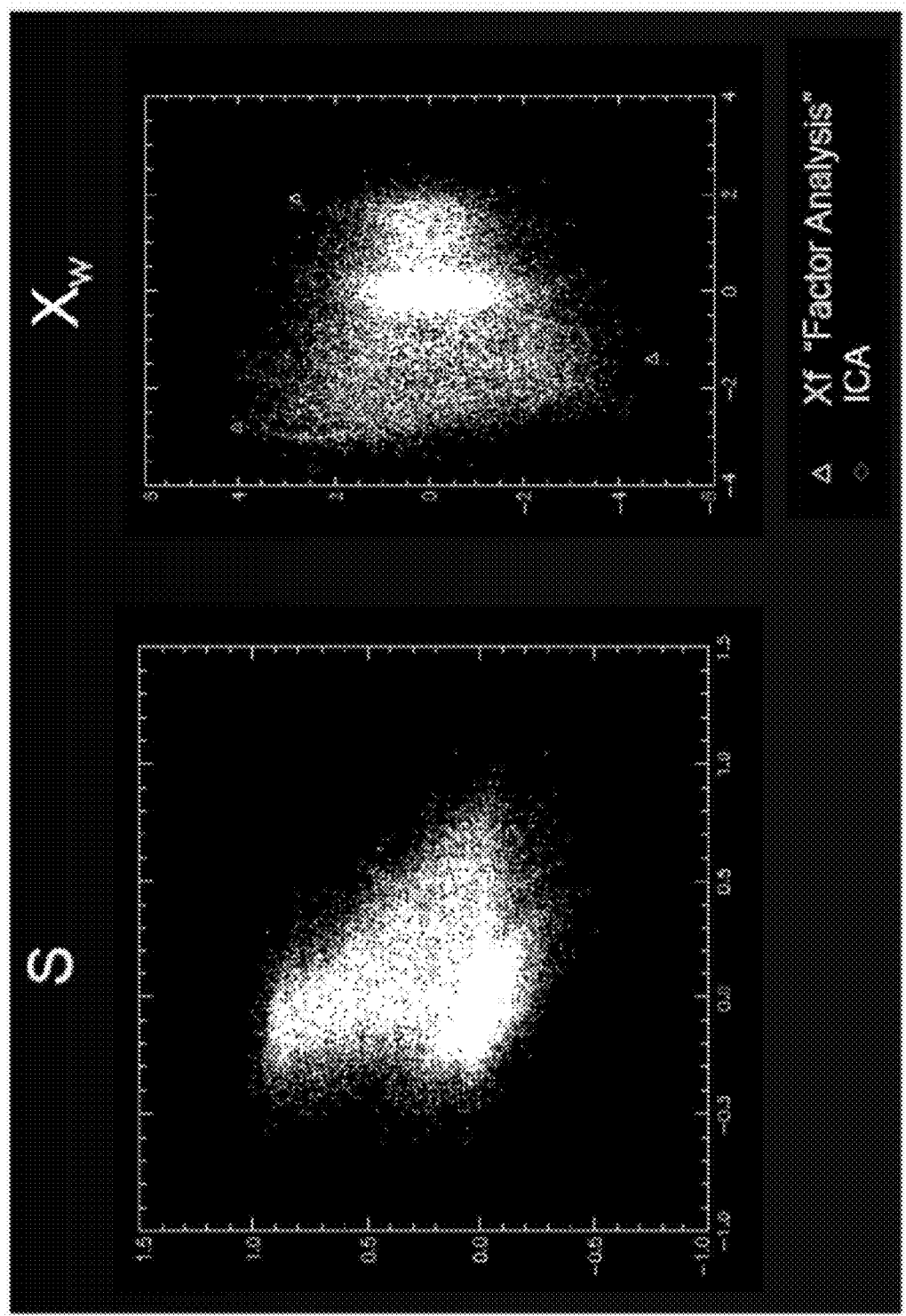
FIG. 20 shows an example source signal (S) and a signal mixture Xw for the second dynamic image (dynamic image #2)
Figure 21:
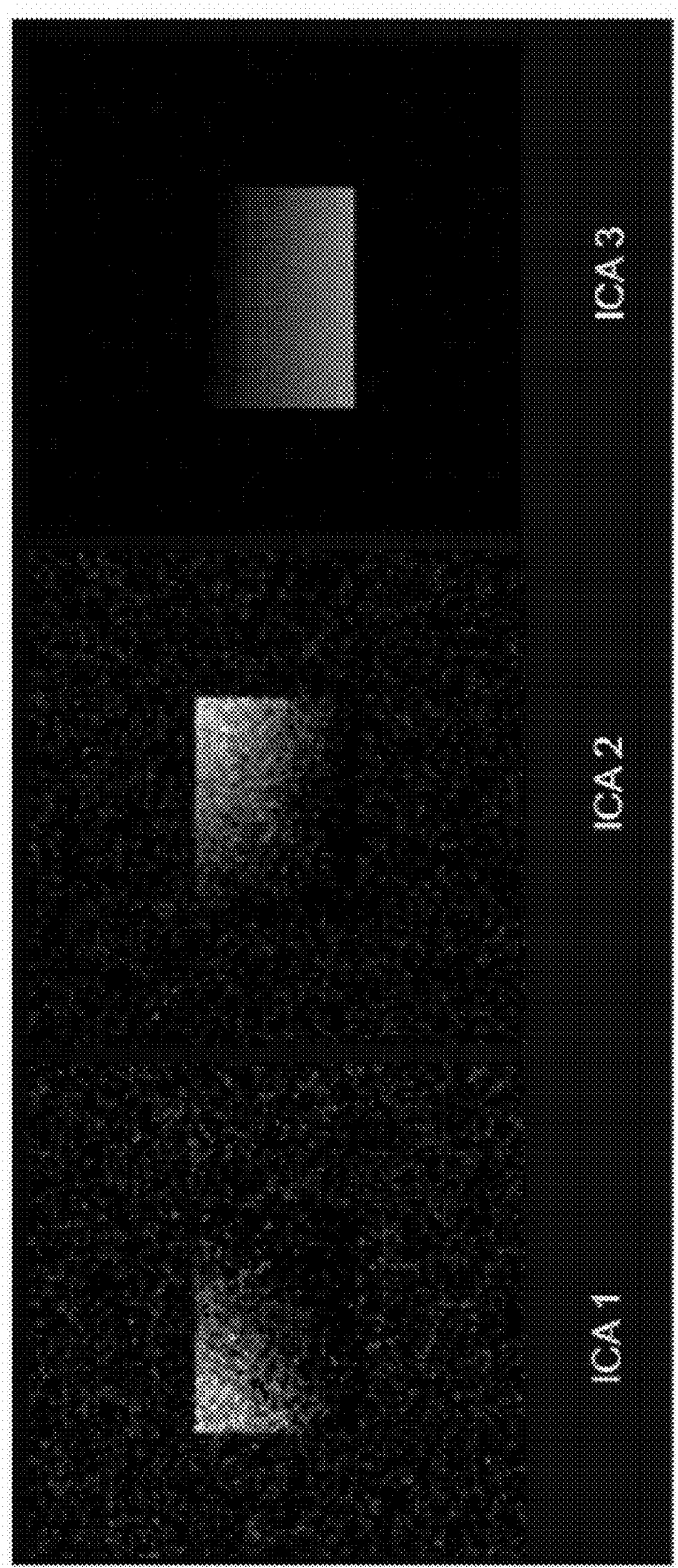
FIG. 21 shows ICA component images indicating the original mixing pattern used to create dynamic test image #2.

FIG. 20 shows an example S and $X_w$ for the dynamic test image #2. The three "independent" component images (FIG. 21) generated from the analysis of dynamic test image #2 show the original mixing pattern used to create the dynamic image. The IDL6.3 software was run on a PC, and a multi-dimensional optimization involving three independent components (i.e., 9 rotation parameters) with 17936 data vectors was completed within 2 minutes. The Nealder Mead simplex method was implemented for the cost function minimization, since it did not require function derivatives and the behavior of the mutual information cost function was known to be erratic. A more efficient gradient based optimizer could be used if the initial conditions are close to the global minimum.

The direct minimization of the mutual information (MI) criteria for independent component analysis (ICA) was shown to be feasible in polar coordinates with multidimensional data, though the result is highly dependent on the selection of the initial optimization parameters. These initial parameters, which represent the direction of the ICA weight vectors in multidimensional space, preferably are within ±10° of the global minima due to the existence of deep minima just outside of this range. Using a high number of histogram bins in calculating the mutual information criteria reduces some of these minima but may not eliminate all deep local minima, as was seen in the second dynamic test image with a high level of spatial mixing.

On the other hand, a high number of histogram bins (N=256) reduced the smoothness of the MI cost function when there was insufficient data samples and did not improve with a technique of distance weighted interpolation. Unlike the MI function applied in image co-registration, small changes in the angular parameters do not create large changes in the joint histogram of the MI calculation. The total MI function became smoother when the number of data vectors was increased by a factor of 4 to 17936 by bilinear interpolation of the original image pixel data. The lower bin sizes could be used if the initial parameters are close to the final solution; i.e., within ±10° of the global minimum.

The example method for finding the initial conditions was based on the assumption that the source signals have higher signal amplitude compared to the corrupting noise. This allows the search for "unique" signal vectors in the PCA space that have "new" directions. The matrix inversion of these unique signal vectors then provides the initial ICA weight vector directions for further optimization. This particular example method clearly will not work if the amplitude of the noise is equivalent or higher than that of the desired source signals. An alternative approach, to find the initial weight vectors, would be a polar "grid" search from −180° to +180°; however, this becomes computationally expensive when dealing with higher dimensions.

By setting all the weight vectors in W to the unit length of 1, there is a reduction in the degrees of freedom for each weight vector by one; i.e., each weight vector's direction is fully defined by k−1 angle parameters (where k is the number of principal components). For the two dynamic test images used in this example, the over parameterization (k parameters×k weight vector rows) did not lead to problems with parameter convergence.

The example method was implemented to handle any number of data dimensions within the limits of IDL's access of computer memory. A faster numerical optimization other than the Nealder Mead simplex could be used if the initial conditions are close to the global minimum. In addition, the Givens rotations can be parallelized once the number of principal components of the analysis has been defined.

The example methods show that minimization of the mutual information can be performed using polar coordinates and can be applied to dynamic PET image data. No a priori information or objective functions were needed, except for an estimate of the number of underlying component signals in the mixture. The mutual information as a cost function can be unpredictable except near the global minimum (e.g., within ±10°). The example function can have local minima, which are dependent on the number of histogram bin sizes used in the calculation of the MI criteria and in the number of data samples used in the analysis.

Nonlimiting example applications of the invention include image processing to separate image mixtures or processes. Generally, example embodiments of the invention are applicable to image, audio, or other electronic signal mixture separation, such as but not limited to extraction of a target signal that is contaminated by other signals.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. In a positron emission tomography (PET) system, a method for producing an image using independent component analysis and separation of components of a mixed electronic signal generated by the PET system, the method comprising:
   sensing signals of interest with detectors of the PET system to provide the mixed electronic signal and outputting the mixed electronic signal from the detectors, the mixed electronic signal representing a mixture of images;
   receiving the mixed electronic signal from the detectors by an image processing system of the PET system;
   determining candidate signal components from the mixed electronic signal;
   directly minimizing mutual information (MI) criteria between each candidate signal component without relying on model probability density functions by setting initial parameters and starting minimization near a global minimum and subsequently testing for convergence at the global minimum; and
   optimizing candidate signal components using polar coordinates to produce optimized signal components;
   extracting a component of the mixed electronic signal from the mixed electronic signal with the optimized signal components; and
   displaying an image from the extracted component on a display, wherein the displayed image is an extracted image from the mixture of images.

2. The method of claim 1, wherein said determining, minimizing, and optimizing provides an unmixing matrix;
   wherein the method further comprises using the unmixing matrix to transform a signal mixture matrix based on the mixed electronic signal;
   wherein said transforming provides signals comprising independent signal vectors.

3. The method of claim 1, wherein said minimizing mutual information criteria comprises:
   providing an unmixing matrix;
   transforming a signal mixture matrix using the unmixing matrix to provide a source matrix; and
   determining total mutual information between rows of the source matrix.

4. The method of claim 3, wherein said optimizing comprises:
   orthogonally rotating each row of the unmixing matrix by a plurality of angles to update the unmixing matrix.

5. The method of claim 4, wherein said optimizing further comprises:
   transforming the signal mixture matrix using the updated unmixing matrix to provide an updated source matrix; and
   determining total mutual information between rows of the updated source matrix.

6. The method of claim 5, further comprising:
   repeating said minimizing and optimizing until converge criteria are met.

7. The method of claim 1, further comprising:
   testing behavior of total mutual information for the candidate signal components as affected by a factor taken from the group consisting of histogram bin size, potential effect of data interpolation, and analysis of numbers of data vectors.

8. The method of claim 1, wherein the mixed electronic signal comprises mixed temporal signals.

9. The method of claim 1, wherein the mixed electronic signal comprises mixed spatial signals.

10. The method of claim 1,
    wherein said sensing signals of interest comprises sensing dynamic signals of interest with detectors of the PET system, wherein the mixed electronic signal represents dynamic image data; and
    further comprising displaying a time-activity curve for the extracted component on the display.

11. In a positron emission tomography (PET) system, a method for producing an image using independent component analysis and separation of components of a mixed electronic signal generated by the PET system, the method comprising:
    sensing signals of interest with detectors of the PET system to provide the mixed electronic signal and outputting the mixed electronic signal from the detectors, the mixed electronic signal representing a mixture of images;
    receiving the mixed electronic signal from the detectors by an image processing system of the PET system;
    determining candidate signal components from the mixed electronic signal;
    directly minimizing mutual information (MI) criteria between each candidate signal component without relying on model probability density functions; and
    optimizing candidate signal components using polar coordinates to produce optimized signal components;
    extracting a component of the mixed electronic signal from the mixed electronic signal with the optimized signal components; and
    displaying an image from the extracted component on a display, wherein the displayed image is an extracted image from the mixture of images,
    wherein said determining, minimizing, and optimizing provides an unmixing matrix;
    wherein the method further comprises using the unmixing matrix to transform a signal mixture matrix based on the mixed electronic signal;
    wherein said transforming provides signals comprising independent signal vectors,
    wherein said minimizing mutual information criteria comprises:

providing an unmixing matrix;
transforming a signal mixture matrix using the unmixing matrix to provide a source matrix; and
determining total mutual information between rows of the source matrix, and
wherein said providing an unmixing matrix comprises:
determining a number of column vectors in the signal mixture matrix that approximate apices in factor analysis, wherein the number of column vectors is equal to the number of the determined candidate signal components;
performing a matrix inversion on the signal mixture matrix to provide an initial unmixing matrix;
orthogonally rotating each row of the initial unmixing matrix by a plurality of angles to provide the unmixing matrix.

12. The method of claim 11, further comprising:
dimensionally reducing mixed signal data to have a number of rows equal to the number of determined candidate signal components; and
whitening the dimensionally reduced signal data to provide the signal mixture matrix.

13. In a positron emission tomography (PET) system, a method for producing an image using independent component analysis of a mixed electronic signal generated by the PET system, the method comprising:
a) generating a mixed electronic signal using detectors of the PET system and determining a number k of candidate signal components in the mixed electronic signal, the mixed electronic signal representing a mixture of images;
b) determining k column vectors in a signal mixture matrix $X_w$ based on mixed electronic signal data, which column vectors approximate apices in factor analysis, to provide a signal mixture matrix $X_f$;
c) performing matrix inversion on the signal mixture matrix $X_f$ to obtain initial weight vectors $w_o$ of an initial unmixing matrix $W_o$;
d) using Givens rotations based on angle θ, orthogonally transforming each $w_o$ separately to create an unmixing matrix W without relying on model probability density functions;
e) transforming the signal mixture matrix $X_w$ with the unmixing matrix W to provide a source matrix S;
f) calculating total mutual information $MI_t$ between each row in S;
g) obtaining a new angle θ;
h) generating Givens rotations R to reapply to each $w_o$ to provide a new unmixing matrix W;
repeating steps e)-h) until convergence criteria are met and extracting signal components from the mixed electronic signal with a final unmixing matrix; and
i) displaying an image from the extracted signal components on a display, wherein the displayed image is an extracted image from the mixture of images.

14. The method of claim 13, wherein the convergence criteria comprise the total mutual information $MI_t$ and each parameter value in θ changing by less than a predetermined amount.

15. The method of claim 13, further comprising:
dimensionally reducing mixed electronic signal data to have a number of rows equal to the number of determined candidate signal components; and
whitening the dimensionally reduced signal data to provide the signal mixture matrix $X_w$.

16. The method of claim 15, wherein said repeating steps e)-h) provides an optimized unmixing matrix;
further comprising:
transform the signal mixture matrix $X_w$ using the mixed electronic signal;
wherein said transforming provides signals comprising independent signal vectors.

17. The method of claim 13, further comprising:
testing behavior of said calculated total mutual information for the candidate signal components as affected by a factor taken from the group consisting of histogram bin size, potential effect of data interpolation, and analysis of numbers of data vectors.

18. The method of claim 13, wherein the mixed electronic signal comprises mixed temporal signals.

19. The method of claim 13, wherein the mixed electronic signal comprises mixed spatial signals.

20. An apparatus comprising computer readable instructions stored on a non-transitory medium, which when executed cause a computer to:
a) receive a mixed electronic signal generated from detectors of a positron emission tomography (PET) system and determine a number k of candidate signal components in the mixed electronic signal, the mixed electronic signal representing a mixture of images;
b) determine k column vectors in a signal mixture matrix $X_w$ based on mixed electronic signal data, which column vectors approximate the apices in factor analysis, to provide a signal mixture matrix $X_f$;
c) perform matrix inversion on the signal mixture matrix $X_f$ to obtain initial weight vectors $w_o$ of an initial unmixing matrix $W_o$;
d) using Givens rotations based on angle θ, orthogonally transform each $w_o$ separately to create an unmixing matrix W without relying on model probability density functions;
e) transform the signal mixture matrix $X_w$ with the unmixing matrix W to provide a source matrix S;
f) calculating total mutual information $MI_t$ between each row in S;
g) obtain a new angle θ;
h) generate Givens rotations R to reapply to each $w_o$ to provide a new unmixing matrix W;
repeat steps e)-h) until convergence criteria are met to provide an optimized unmixing matrix;
(i) transform the signal mixture matrix $X_w$ with the optimized unmixing matrix to provide signals comprising independent signal vectors and extracting the independent signal vectors from the mixed electronic signal; and
(j) display an image from the extracted independent signal vectors on a display of the computer, wherein the displayed image is an extracted image from the mixture of images.

* * * * *